(12) United States Patent
Olcott et al.

(10) Patent No.: US 8,258,480 B2
(45) Date of Patent: Sep. 4, 2012

(54) HIGH ENERGY PHOTON DETECTION USING PULSE WIDTH MODULATION

(75) Inventors: Peter D. Olcott, Stanford, CA (US); Craig S. Levin, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 394 days.

(21) Appl. No.: 12/397,195

(22) Filed: Mar. 3, 2009

(65) Prior Publication Data

US 2010/0025589 A1  Feb. 4, 2010

Related U.S. Application Data

(60) Provisional application No. 60/067,905, filed on Mar. 3, 2008.

(51) Int. Cl.
  *G01T 1/161* (2006.01)
(52) U.S. Cl. .................................. 250/363.02
(58) Field of Classification Search .............. 250/362, 250/363.01–363.1, 370.01–370.15
  See application file for complete search history.

(56) References Cited

U.S. PATENT DOCUMENTS

| | | | |
|---|---|---|---|
| 6,114,703 | A | 9/2000 | Levin et al. |
| 7,049,600 | B2 | 5/2006 | Levin |
| 2004/0124360 | A1 | 7/2004 | Levin et al. |
| 2007/0102641 | A1 | 5/2007 | Schmand et al. |
| 2008/0042070 | A1 | 2/2008 | Levin |
| 2008/0203309 | A1* | 8/2008 | Frach et al. .............. 250/362 |
| 2009/0093710 | A1 | 4/2009 | Levin |
| 2010/0078569 | A1* | 4/2010 | Jarron et al. ......... 250/363.04 |

FOREIGN PATENT DOCUMENTS

WO  WO 2008/040384  4/2008

OTHER PUBLICATIONS

Anghinolfi, F., et al., "NINO: An ultrafast low-power front-end amplifier discriminator for the time-of-flight detector in the ALICE experiment," IEEE Trans. Nucl. Sci. 51, 1974 (2004).
Catana, C., et al., "Simultaneous acquisition of multislice PET and MR images: initial results with a MR-compatible PET scanner," J Nucl Med. Dec. 2006;47(12):1968:76.
Fries, M.D., et al., "High-precision TDC in an FPGA using a 192 MHz quadrature clock," Nuclear Science Symposium Conference Record, 2002 IEEE, vol. 1, No., pp. 580-584, vol. 1, Nov. 10-16, 2002.
Kephart, R., et al., "E-537 MWPC amplifier", FNAL; ERA-10-009019; EDB-85-024438, 1979.

(Continued)

*Primary Examiner* — Kiho Kim
(74) *Attorney, Agent, or Firm* — Greer Burns & Crain Ltd

(57) ABSTRACT

Methods and systems for processing an analog signal that is generated by a high energy photon detector in response to a high energy photon interaction. A digital edge is generated representing the time of the interaction along a first path, and the energy of the interaction is encoded as a delay from the digital edge along a second path. The generated digital edge and the delay encode the time and energy of the analog signal using pulse width modulation.

24 Claims, 17 Drawing Sheets

OTHER PUBLICATIONS

Kipnis, I., et al., "A time-over-threshold machine: the readout integrated circuit for the BABAR Silicon Vertex Tracker," Nuclear Science, IEEE Transactions on, vol. 44, No. 3, pp. 289-297, Jun. 1997.

Krieger, B., et al., "SVX4: a new deep-submicron readout IC for the Tevatron collider at Fermilab," Nuclear Science, IEEE Transactions on, vol. 51, No. 5, pp. 1968-1973, Oct. 2004.

Levin, C.S., et al., "Investigation of position sensitive avalanche photodiodes for a new high-resolution PET detector design," Nuclear Science, IEEE Transactions on, vol. 51, No. 3, pp. 805-810, Jun. 2004.

Manfredi, P. F., et al., "Noise limits in a front-end system based on time-over-threshold signal processing, Nuclear Instruments and Methods in Physics Research Section A: Accelerators, Spectrometers, Detectors and Associated Equipment," vol. 439, Issues 2-3, Jan. 11, 2000, pp. 361-367.

Meyer, T.C., et al., "A Time-Based Front End Readout System for PET & CT," Nuclear Science Symposium Conference Record, 2006. IEEE, vol. 4, no., pp. 2494-2498, Oct. 29-Nov. 1, 2006.

Olcott and Levin, "Pulse Width Modulation: a Novel Readout Scheme for High Energy Photon Detection", 2008, IEEE Nuclear Symposium Conference Record, pp. 4530-4530.

Paneque et al., "Analogue Signal Transmission by an Optical Fiber System for the Camera of the MAGIC Telescope", 28th Intl. Cosmic Ray Conference, 2003, pp. 2927-2930.

Pichler, B.J., et al., "Performance test of an LSO-APD detector in a 7-T MRI scanner for simultaneous PET/MRI," J. Nucl Med. Apr. 2006;47(4):639-47.

Shimazoe, K., et al., "Novel front-end pulse processing scheme for PET system based on pulse width modulation and pulse train method," Nuclear Science Symposium Conference Record, 2007. NSS '07. IEEE, vol. 6, no., pp. 4612-4614, Oct. 26-Nov. 3, 2007.

Albuquerque, E., et al., "The Clear-PEM Electronics System," IEEE Transactions on Nuclear Science, vol. 53, No. 5, pp. 2704-2711, Oct. 2006.

Pratte, J.F., et al., "The RatCAP Front-End ASIC," IEEE Transactions on Nuclear Science, vol. 55, No. 5, pp. 2727-2735, Oct. 2008.

Jinyuan, et al., "Firmware-only Implementation of Time-to-Digital Converter (TDC) in Field-Programmable Gate Array (FPGA)," Nuclear Science Symposium Conference Record, 2003 IEEE, vol. 1, pp. 177-181, Oct. 2003.

* cited by examiner

US 8,258,480 B2

HIGH ENERGY PHOTON DETECTION USING PULSE WIDTH MODULATION

PRIORITY CLAIM AND REFERENCE TO RELATED APPLICATION

This application claims the benefit of U.S. Provisional Application Ser. No. 61/067,905, filed Mar. 3, 2008, under 35 U.S.C. §119. U.S. Provisional Application Ser. No. 61/067,905 is incorporated in its entirety by reference herein.

STATEMENT OF GOVERNMENT INTEREST

This invention was made with Government support under contracts EB003283 and CA119056 awarded by the National Institutes of Health. The Government has certain rights in this invention.

FIELD OF THE INVENTION

A field of the invention is imaging. Example applications of the invention include, but are not limited to, nuclear imaging, nuclear medicine, defense applications, and oil well drilling.

BACKGROUND OF THE INVENTION

High energy photons need to be detected in a variety of applications including but not limited to nuclear science, high energy physics, astronomy, and medical imaging. In many high energy photon (e.g., x-ray, gamma ray or annihilation photon) detectors, information from individual interactions are recorded, including parameters such as the time of the event, the energy of the event, and the location of the event. These parameters are determined through certain processing algorithms applied to the analog signals that the detector generates.

As nonlimiting examples, FIG. 1 shows arrival time difference spectra for a pair of coincident interactions of two high energy (511 keV) photons generated from a positron-electron annihilation event. As will be appreciated by those in the art, the two photons interact in opposing high energy photon detectors aligned with the direction of photon emission. The arrival time of each coincident photon can be determined and then subtracted to form a histogram of the time differences. FIG. 2 shows an example energy spectrum of high energy photon interactions in a scintillation detector in response to irradiating it with 511 keV photons and 1.2 MeV photons from a Na-22 source. The pulse-height of the signal (x-axis) is proportional to the energy of the photon interaction of the detector. FIG. 3 shows spatial distributions of high energy photon interactions in a position sensitive high energy photon scintillation crystal array detector. A high energy photon detector can record position (discrete or continuous) of high energy photon interactions.

However, the transmission of such analog signals for processing can present problems. For example, because several detectors often are used in a given application, many individual signal lines (e.g., wires) are required to carry encoded analog signals. The number of signal lines increases even further for delivering various types of information. Additionally, the quality of the signal may deteriorate, particularly if the detector is located in certain environments (as a nonlimiting example, magnetic environments, such as within a magnetic resonance imaging (MRI) detector), or is multiplexed to reduce number of readout channels.

SUMMARY OF THE INVENTION

Embodiments of the invention provide, among other things, methods and systems for processing an analog signal that is generated by a high energy photon detector in response to a high energy photon interaction. In an example method, a digital edge is generated representing the time of the interaction along a first path, and the energy of the interaction is encoded as a delay from the digital edge along a second path. The generated digital edge and the delay encode the time and energy of the analog signal using pulse width modulation.

DETAILED DESCRIPTION

As described above, in standard high energy photon detectors, for an event such as a scintillation event, information from individual interactions is recorded, such as the time of the event, the energy of the event, and the location of the event. These parameters are determined through certain analog signal processing algorithms applied to the analog signals that the detector generates. For example, the energy and location information may be processed using an analog-to-digital (ADC) converter that samples an analog value that is proportional to the integral of the charge created by the scintillation event.

Figure 1:
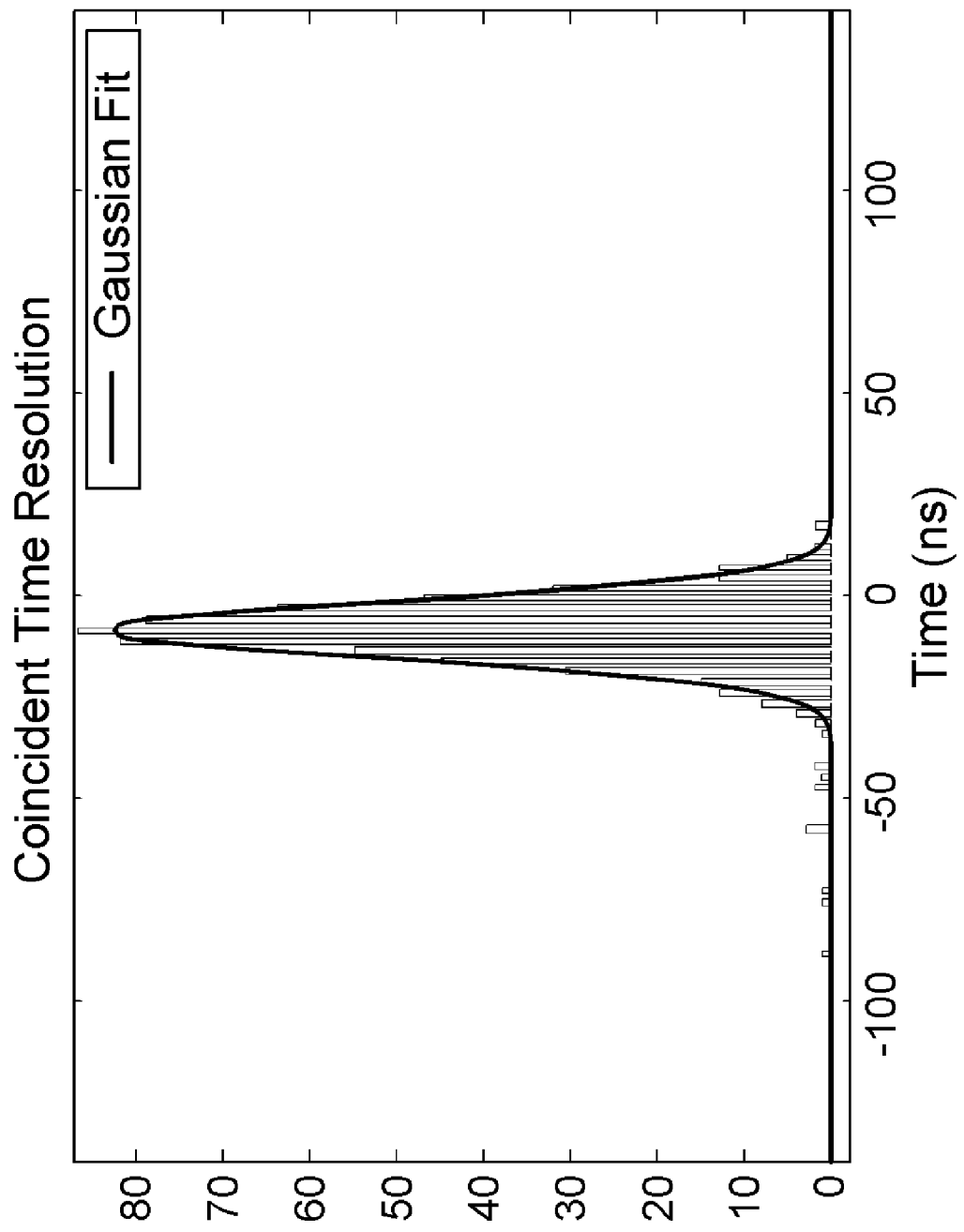
FIG. 1 shows arrival time difference spectra for a pair of coincident interactions of the two high energy (511 keV) photons generated from a positron-electron annihilation event.
Figure 2:
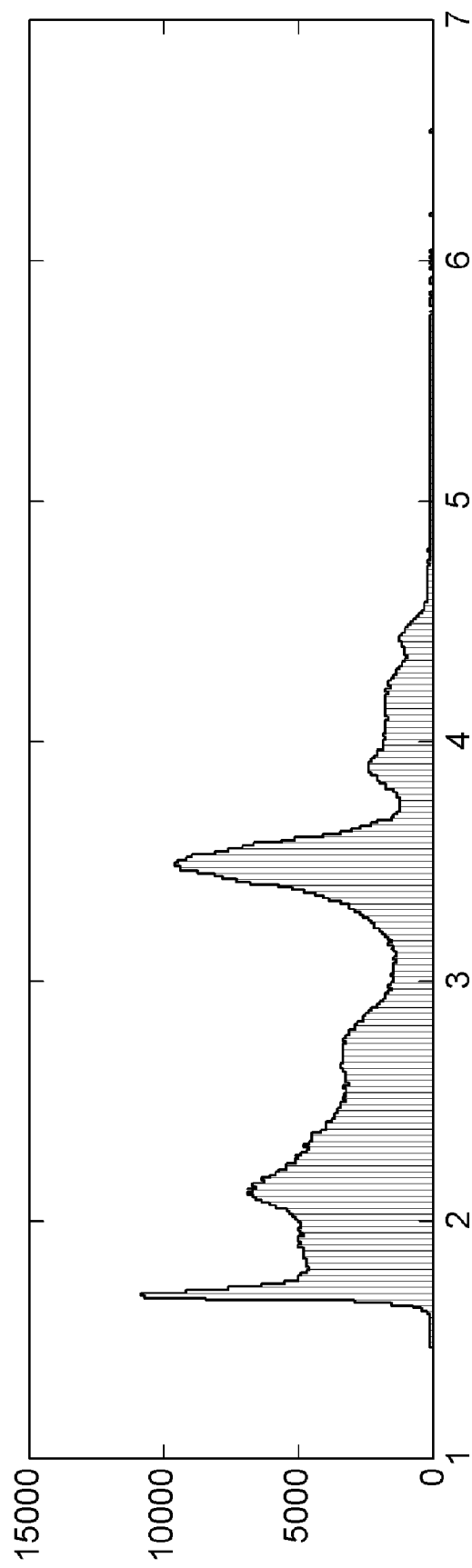
FIG. 2 shows an example energy spectrum of high energy photon interactions in a scintillation detector in response to irradiating it with 511 keV photons and 1.2 MeV photons from a Na-22 source.
Figure 3:
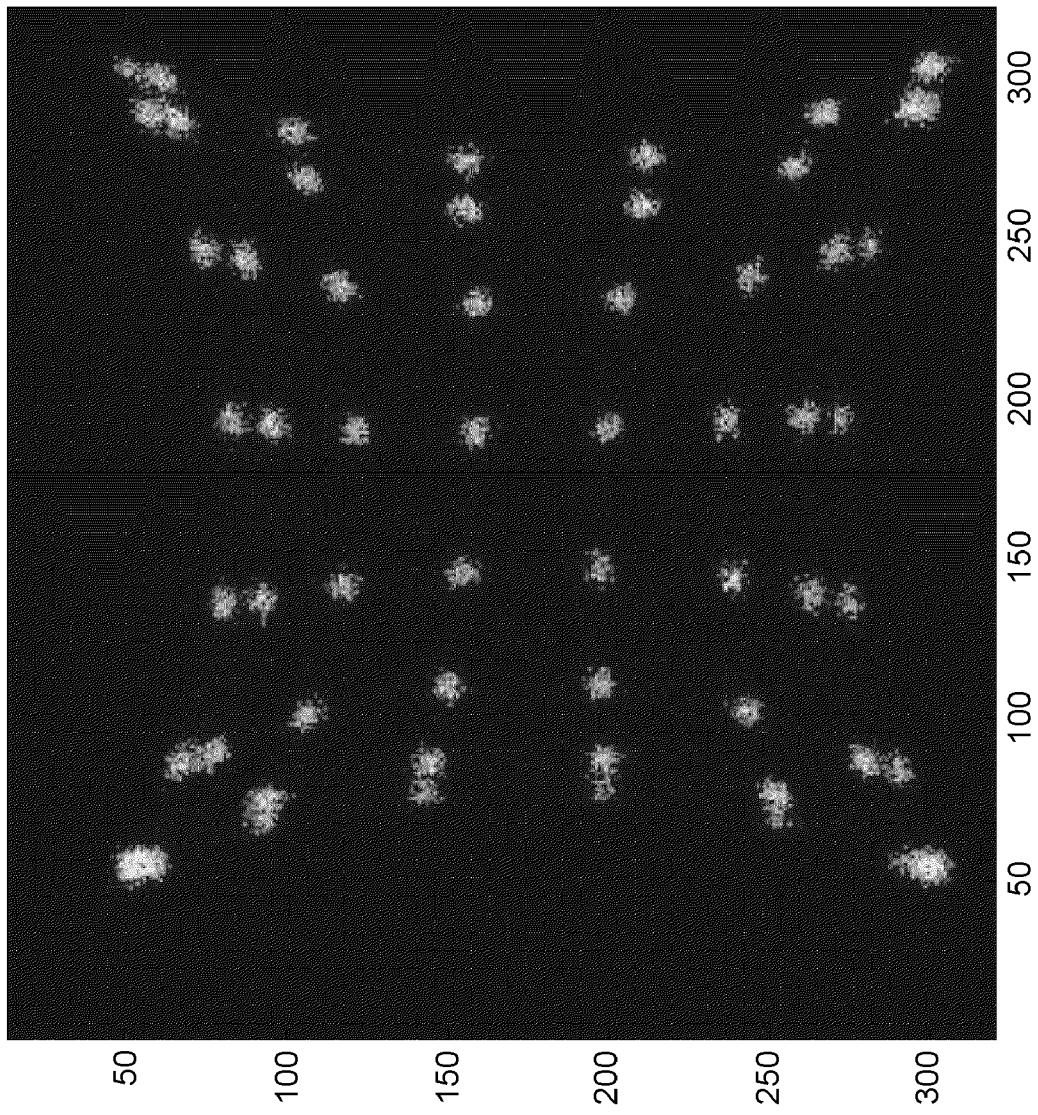
FIG. 3 shows a 2-D histogram of spatial distributions of high energy photon interactions in a position-sensitive high energy photon scintillation crystal array detector.
Figure 4:
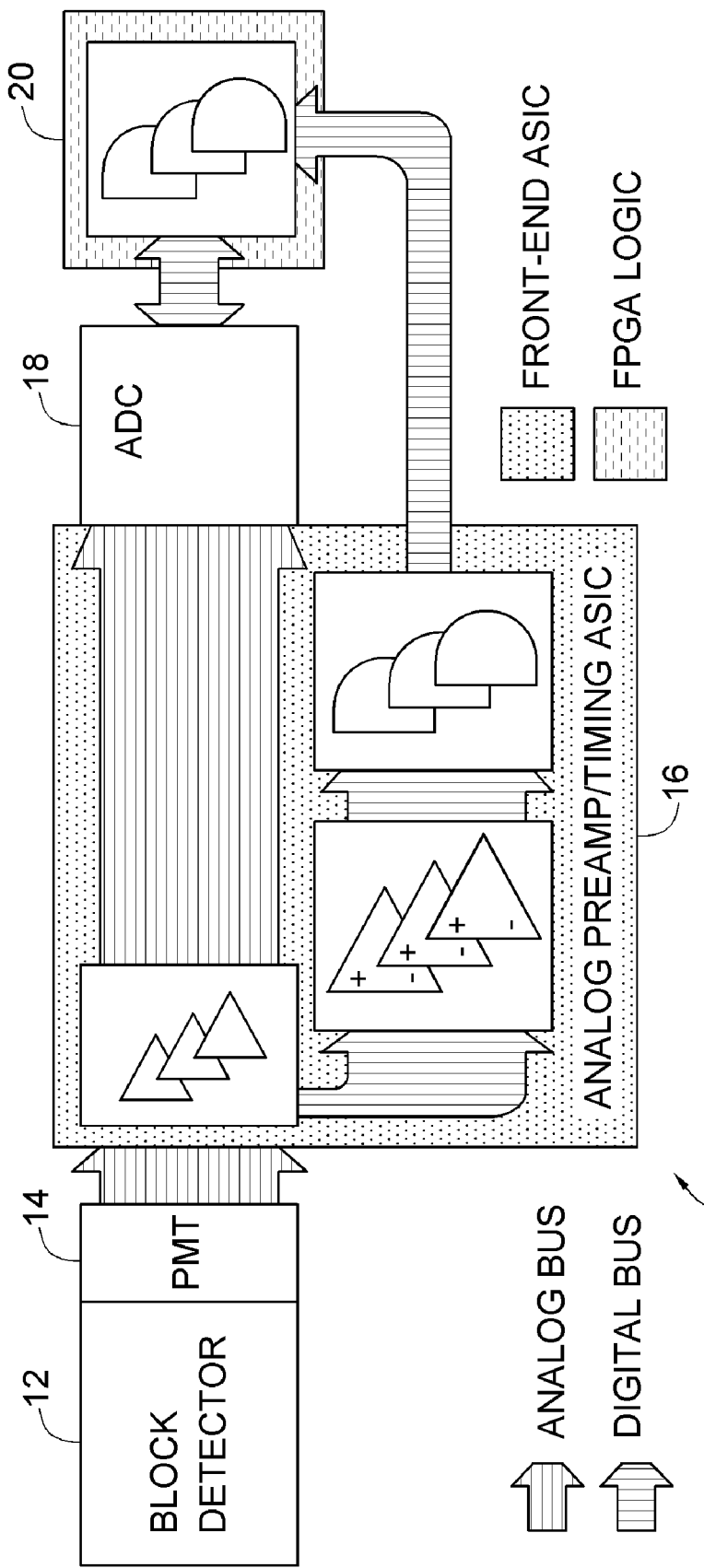
FIG. 4 shows a PET block detector readout with light multiplexing.

However, more recent, very high resolution high energy photon detection systems require new data acquisition architectures to accommodate the large increase in the number of readout channels. For example, FIG. 4 shows light multiplexing being used to reduce the number of readout channels in a conventional PET block detector readout system 10. In FIG. 4, a block detector 12 and photomultiplier tubes (PMT) 14 produces a signal sent over an analog bus to a low channel count (4-channel) ASIC 16. Four ADCs 18 read each analog channel, the result of which is output to a readout system such as but not limited to a field programmable gate array (FGPA) 20 with suitable logic. This system 10 scales poorly in the number of ADCs required as the channel count increases.

Figure 5:
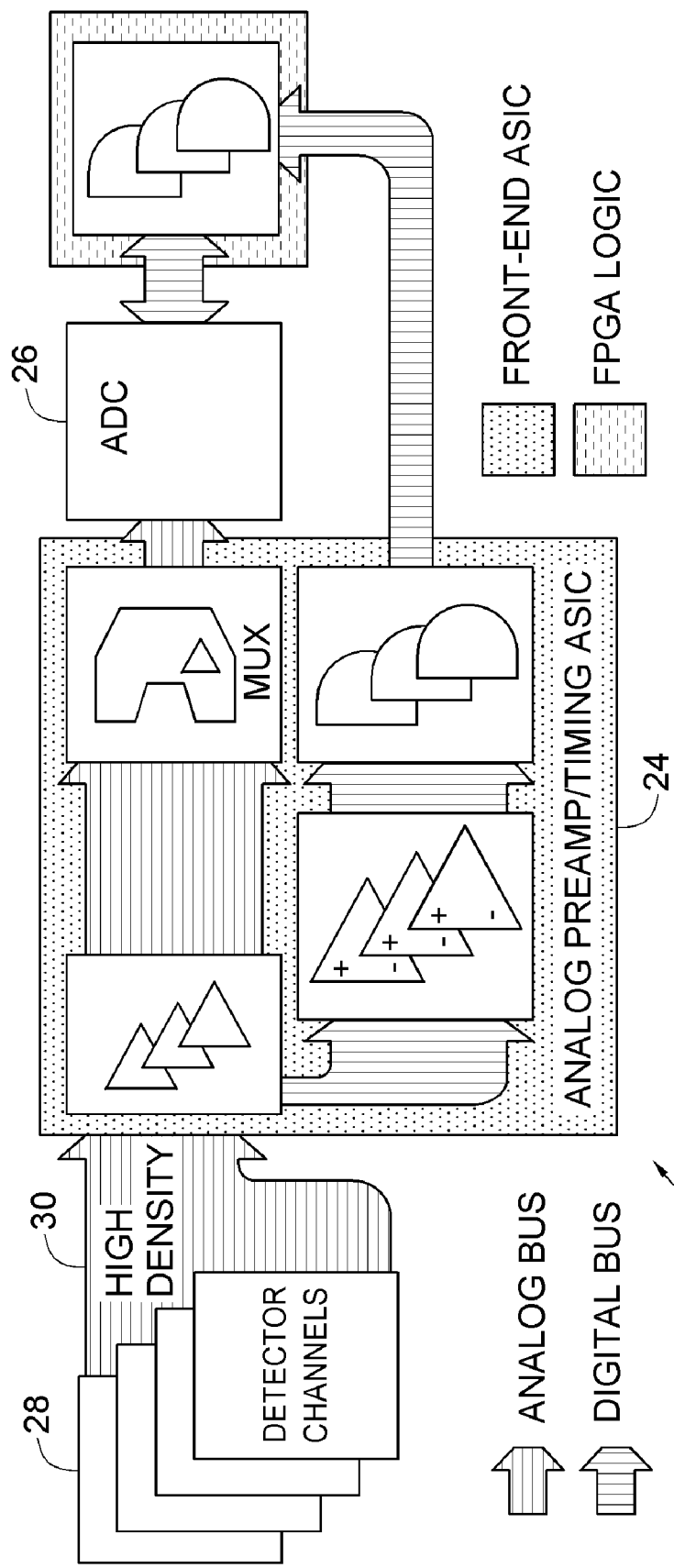
FIG. 5 shows a detector with a multi-channel readout ASIC.

FIG. 5 shows a multi-channel readout system 22 including a multi-channel readout ASIC (32 or 64 channels) 24 combined with triggering, an analog memory, and a single ADC 26, which reduces the number of channels 28 to a reasonable level. However, the high analog channel count ASIC 24 has problems with a high density analog bus 30.

For an improved architecture to implement very high channel count PET data acquisition systems, pulse width modulation (PWM) has significant advantages over previous generations of readout architectures. Thus, embodiments of the present invention modulate the width, rather than the amplitude, of a digital pulse to be proportional to the integral of the charge created. The analog value of the outgoing digital pulses may be recovered by using a time-to-digital converter (TDC) in back-end electronics, preferably without the need for an ADC. Further, it is possible to provide a purely digital high density back end. In an example embodiment, the same TDC used to record the time of the event can be used to recover the amplitude.

Generally, embodiments of the invention provide methods, apparatuses, and systems for encoding photon interaction information, such as the arrival time, energy, and location of each high energy photon interaction in a detector using the different arrival times of various edges of a digital signal, rather than in the amplitude of an analog signal, as provided in conventional approaches. This pulse width modulation is analogous to the different methods of phase modulation and amplitude modulation of an analog carrier in continuous radio frequency modulation. Digital encoding of the signal, especially onto a single wire or fiber, allows more flexibility and drastically simpler data acquisition electronics over analog encoding of the signal.

Further, an example circuit according to embodiments of the present invention allows a PWM readout scheme different from time over threshold PWM circuits used in high energy physics. PWM techniques simplify the routing to the back end electronics without degrading the performance of the system. An example readout architecture based on PWM processes digital rather than analog pulses, which can be very easily multiplexed, allowing one to achieve very high channel density required for ultra-high resolution, 3-D positioning high-energy photon detector systems.

Apparatuses and systems according to certain embodiments of the invention include, but are not limited to, a front-end for an imaging system that couples to a high-energy photon detector, a front-end including a high-energy photon detector, and an imaging system having such front-ends. A nonlimiting example apparatus for performing methods according to the present invention is a front-end for a positron emission tomography (PET) system as shown in the following figures, though those of ordinary skill in the art will appreciate that other systems having emitted photons may be used. PET is a medical imaging modality that uses positron emitting radionuclides attached to specific molecules that are introduced into the body of an animal and tracked by a PET system to provide sensitive assays of a wide range of biological processes relating to cancer or other diseases associated with alterations in the functional metabolism of cells in the body. Tracking is possible because the radionuclides emit high-energy photons that are detected with high spatial, spectral and temporal resolution by PET system detectors. For example, two high energy (e.g., 511 keV) photons are generated from a positron-electron annihilation event. The two photons interact in opposing high energy photon detectors (coincident interaction) aligned with the direction of photon emission. Embodiments of the present invention convert this exponentially decaying signal (e.g., via an exponentially decaying light signal or a signal from a direct bandgap semiconductor) into a digital edge and a width.

In applications such as but not limited to PET, the time information is extremely important. In an example embodiment and method of the present invention, time is encoded using a low jitter timing discriminator. The charge from the high energy interaction in the detector triggers a comparator. A logic signal is generated that is slightly delayed from the interaction. The energy of the signal is created by a circuit that converts the amplitude of the received charge into a time delay from the logic signal generated from the discriminator. This creates a pulse width, the width being the time difference between the first logic signal and the second, which is proportional to the amplitude.

Figure 6:
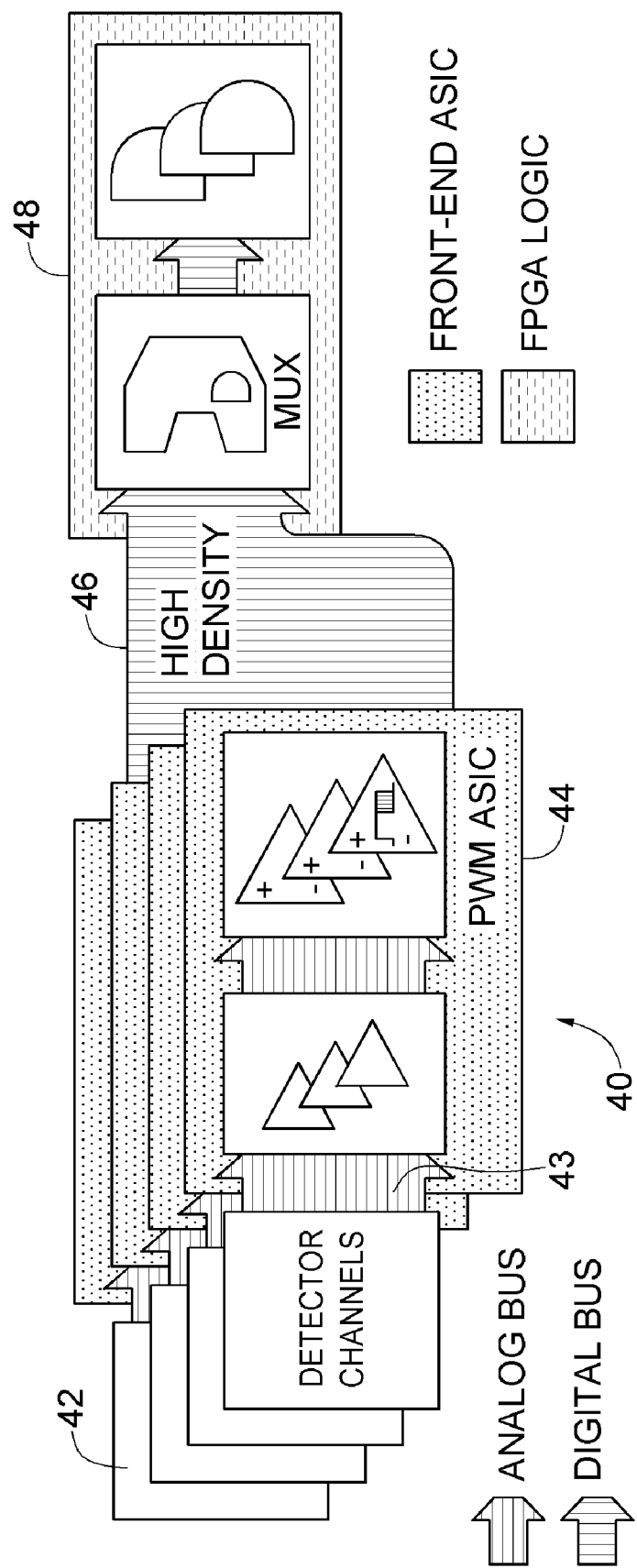
FIG. 6 shows a high channel count digital architecture with a front-end ASIC pulse width modulator, according to an embodiment of the present invention.

Turning now to the drawings, FIG. 6 shows a high channel count digital architecture 40 according to an embodiment of the present invention. Each of a plurality of detector channels 42 outputs via a digital bus 43 to a low channel count front-end ASIC pulse width modulator 44, which in turn outputs to a high density digital bus 46. In this example embodiment, no ADCs are needed to digitize amplitude modulation. This example system enables the move to a purely digital high density back end 48 embodied in suitable FPGA logic.

Example methods and systems of the present invention encode the time, energy, and location of each high energy photon interaction in a detector using the different arrival times of various edges of a digital signal, rather than in the amplitude of an analog signal. An example PWM scheme marries the fast constant fraction discriminator (CFD) timing needed for PET and the time counter principles behind the Wilkinson ADC conversion technique for encoding amplitude. Because it is relatively simple to implement a very high degree of multiplexing using digital pulses, the example PWM readout architecture 40 can potentially readout more channels than a high density analog readout architecture without using ADCs. With the advent of very high channel count field programmable gate arrays (FPGAs) synthesized into very high performance TDCs, the digital back-end readout of PWM architectures, even with thousands of readout channels, can be easily realized in certain example embodiments using off the shelf components and simple high density digital buses, though other components and buses are also contemplated.

PWM circuits utilizing time-over-threshold (TOT) have been used to digitize amplitude information of nuclear decay and drift chambers. In TOT techniques, by setting a threshold voltage above zero, an amplitude dependent pulse width can be generated from a Gaussian, or other CR-RC type shaped pulse. However, TOT techniques suffer from problems that discourage its use in certain high energy photon detection systems.

For example, the noise of TOT depends on the shaping circuits used and strongly depends on the inherent non-linearity of the width versus amplitude dependence. Since the decay of a Gaussian-shaped pulse falls off exponentially with the time, it does not provide the good delay linearity needed for a robust PWM scheme. The data acquisition architectures of TOT are used in very high channel count physics experiments using silicon vertex trackers and calorimeters. New high resolution PET systems, as one example, have similar high channel count needs as these high energy physics experiments.

Figure 7:
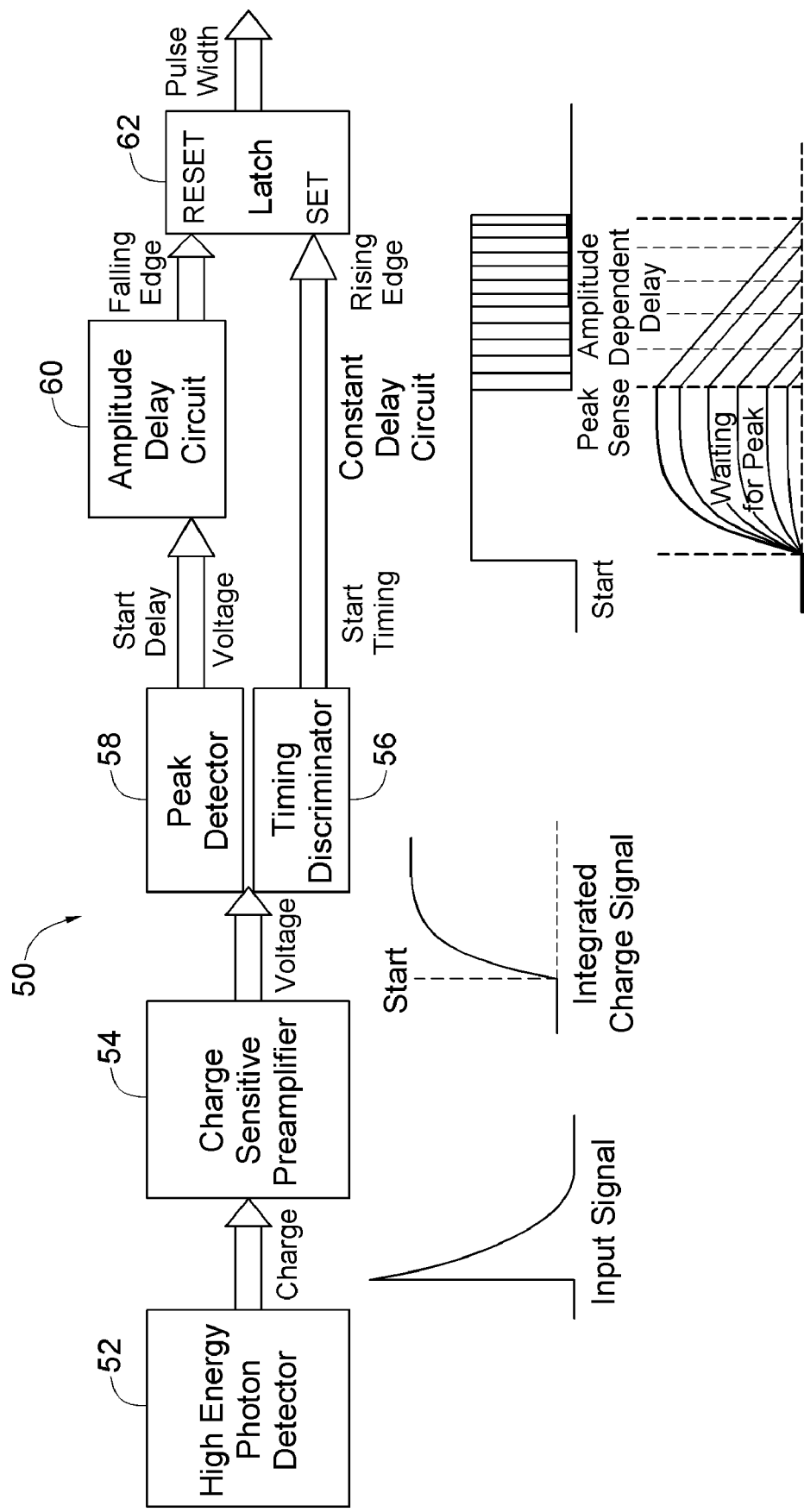
FIG. 7 shows an example front end circuit for a high energy photon detector, according to an embodiment of the present invention.

As shown in FIG. 7, an example high energy photon detection system, such as but not limited to a PET system, includes a front end 50 having a high energy photon detector 52 that is positioned to detect photons from a source of emitted photons and produce an analog signal. The high energy photon detector 52 can include one of a plurality of high energy photon detectors, such as, but not limited to, one or more scintillation crystals coupled to one or more magnetically insensitive semiconductor photodetectors, one or more magnetically insensitive direct interaction semiconductors, or traditional photodetectors including photomultiplier tubes, etc. Those of ordinary skill in the art will appreciate that various sources of emitted photons and high energy photon detectors are possible, and the present invention is not to be limited to a particular configuration for either the source of emitted photons or the high energy photon detector 52.

In example operations, the high energy photon detector 52 produces an analog signal as a charge in response to a high energy photon interaction. This analog signal (e.g., charge) has a temporal dependence, and represents the energy of the incoming high energy photon. The signal varies in time based on the random process of radioactive decay and varies in energy based on the physical transport of photons through matter.

The high energy photon detector 52 may be suitably coupled (e.g., electrically connected), directly or indirectly, to a pulse width modulation front-end circuit, including an analog preamplifier circuit, for example a shaping amplifier such as a charge sensitive preamplifier 54. A nonlimiting example of a charge sensitive preamplifier is based on an electrical circuit that produces a voltage that is proportional to charge. Example electrical couplings include discrete networks of components that pass the charge from the detector 52 to the preamplifier 54. The charge sensitive preamplifier 54 converts the charge to a voltage signal output. For example, the preamplifier integrates the charge.

Generally, the output is converted to a digital signal having a first edge (e.g., a rising edge) representing a time of the original analog signal, and second edge (e.g., a falling edge) representing amplitude. Each edge transition encodes a unique analog value. Preferably, the time encoding and the energy encoding take place along two separate paths, which are referred to herein as a first path and a second path, though this designation is not intended to require a particular ordering.

For example, to encode the time of the event, the output of the preamplifier circuit 54 (e.g., the integrated signal) is sent to a time encoding circuit, such as a timing discriminator 56 (e.g., constant fraction or leading edge), along a first path, generating a digital edge that represents the time of the start of the event. This first edge of the signal should be as accurate as possible. The timing discriminator 56 may, as a nonlimiting example, generate a digital edge at the time where the signal can be first reliably detected above noise. For instance, the time encoding circuit may, when a voltage or current of the analog signal crosses a threshold, generate a signal with the time of the event to provide a fixed edge.

An example timing discriminator is a constant fraction discriminator that generates a timing signal that is independent of the amplitude of the signal, though other time encoding circuits, such as but not limited to a good comparator, may also be used. It is preferred that the preamplifier circuit 54 and the timing discriminator 56 be combined into a single circuit (e.g., a single chip) suitably coupled to the high energy photon detector 52.

To encode the energy of the event, the output signal of the preamplifier circuit (e.g., the falling signal edge) is also connected to a delay encoding circuit along a second path that converts the width of the preamplifier circuit output signal to a delay from the first edge (produced by the timing discriminator). This splitting of the output signal into separate paths or channels for timing and energy encoding is significantly different from TOT methods, which conventionally have suffered from degraded timing and/or energy performance.

In example embodiments, a falling signal edge is produced with constant slope decay from a peak signal. Because the peak signal is proportional to the integral of the charge, and therefore the energy of the event, the amplitude will decay with a constant slope. By detecting when this amplitude decays to zero with a suitable detector such as a comparator, the delay from the start of the event is proportional to the amplitude.

An example of a delay encoding circuit is a pulse width modulator. The pulse width modulator includes a peak detector circuit 58 that detects the peak after integrating and preferably shaping (e.g., Gaussian shaping or optimally filtering) the input charge. After detecting the peak, a detection circuit can enable a delay circuit 60 that is proportional to amplitude. An example of a delay circuit is a current source that discharges a capacitor. If the current is proportional to the amplitude, then the time to discharge the capacitor to no charge will be linearly related to the amplitude. In an example method, the peak detector 58 records the peak of the integration, and the charge is converted to an amplitude over a certain time. The circuit detects when the peak has been reached, and begins discharging a timing element.

In an example embodiment, a comparator detects when the amplitude of the delay circuit signal decays to zero or some other number. For example, the amplitude may be placed onto a capacitor. When the timing accurate trigger fires, the preamplifier circuit immediately puts a rising edge on the output. Because the preamplifier integrates the input charge, the time from the start of the pulse to the peak is always a constant amount of time regardless of the amplitude of the pulse. The peak should be sampled after a fixed delay duration from the start of the pulse. That fixed delay time is application specific, and related to the time required for a given detector to reach the optimal signal-to-noise ratio. The peak can be reliably sampled by using a peak detection circuit.

After the peak is sampled, the amplitude then immediately starts a discharge from the capacitor in a controlled fashion (e.g., linear, though other methods may be used). When the capacitor decays to zero (or other threshold low), the comparator indicates low. The low time minus the high time determines the width of the pulse. The delay from the start of the event is proportional to the amplitude, because the amplitude of the preamplifier circuit output decays with a constant slope. This signal represents the energy of the event. Thus, in this example pulse width modulation circuit 50, one energy and one time value can be encoded into a single digital signal.

In particular example embodiments of the present invention, the timing discriminator 56 is embodied in a constant fraction discriminator (CFD), which encodes the arrival time and reduces time walk. Additionally, the peak detector 58 captures the maximum signal from a Gaussian shaped signal and generates a ramp function that linearly decays to zero. By splitting the signal into two paths, the signal-to-noise-ratio (SNR) of coincidence timing can be optimized at the same time as the SNR of the energy signal. Certain TOT-based ASICs, on the other hand, use little or no shaping to attain the best timing performance, and this severely degrades the SNR of the energy channel. Other TOT-based ASICs use Gaussian shaping with good SNR for energy performance, but this slow shaping significantly degrades timing performance.

Another advantage of certain example embodiments of the present invention is that in certain types of high energy photon data acquisition, such as standard PET data acquisition, timing is performed by a constant fraction discriminator (CFD) to reduce the amplitude dependent time walk. In embodiments of the present invention, the scintillation pulse is driven into a CFD that sets a latch 62 started at the rising edge. The scintillation signal may have some small amount of fast shaping to optimize the timing resolution. In terms of time pickoff, an example design is identical to and will have the same performance as standard PET electronics.

The pulse width modulation circuit 50 can be seen as an ADC operating on the energy portion of the scintillation pulse. In a more particular embodiment, the scintillation signal is first shaped by a Gaussian shaper (e.g., part of peak detector 58) set with a time constant to maximize SNR. Because the Gaussian shaper is a linear transform of the scintillation signal, the time between the start of the pulse and the peak of the Gaussian shaper will be constant. This is exploited in current PET detector readout electronics designs by firing a sample and hold to sample at this peak.

Figure 8:
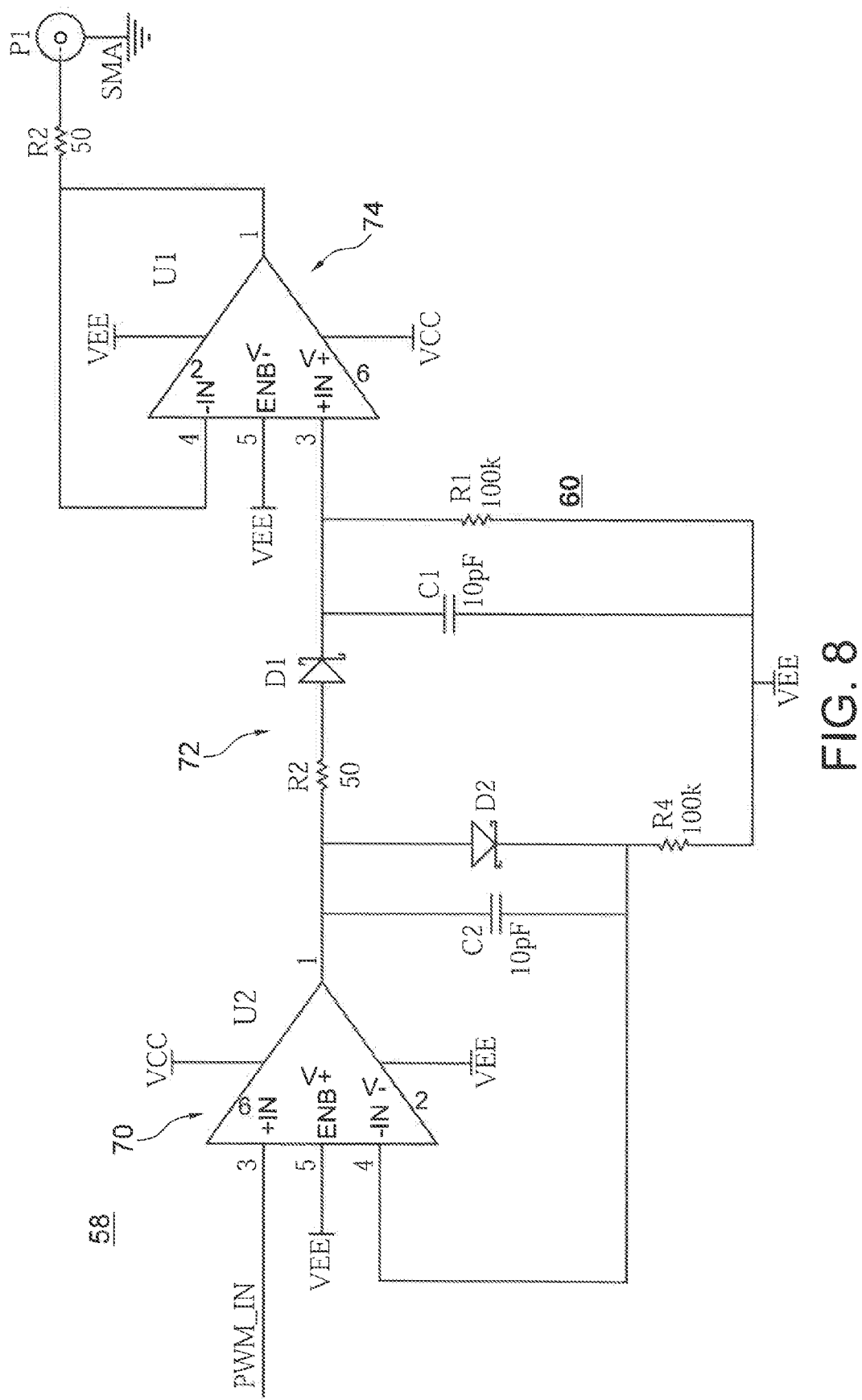
FIG. 8 shows an example peak detector with delay circuit, according to an embodiment of the present invention.

To capture the peak of the Gaussian shaper, an example embodiment implements a very fast peak detector with a linear ramp discharge. For example, as shown in FIG. 8, an example embodiment of the present invention provides a high speed analog peak detector 70 with RC delay circuit 72. High speed Shockley diodes D1 and D2 are matched. An offset voltage of the Shockley diodes is needed due to the forward drop in the feedback of the op-amp. Capacitor C1 holds the peak voltage. When the input drops below the peak, the capacitor discharges with a time constant of R1*C1. The terminal of R1 is tied to VEE to improve linearity. The resistors and capacitors can be changed to provide better dynamic range and less quantization noise with a corresponding tradeoff in pile-up at high event rates.

For discrete implementations, a peak detector is simpler than the associated electronics to fire a sample-and-hold precisely at the peak of the signal. The example peak detector has a capacitor to store the value. With a simple resistor, an approximately linear discharge current can be generated that decays based on an RC product. The peak detector will begin to decay as soon as the output of the Gaussian shaper falls below the value of the storage capacitor. On the other hand, a sample-and-hold circuit would not have this limitation and could begin decaying immediately after sampling the value. Therefore, for an ASIC implementation, a sample-and-hold circuit would be preferred over a peak detector because the ramp could decay faster than the falling edge of the Gaussian shaper, which would improve count rate performance.

The output of the PWM with a linear ramp discharge is fed into a high speed comparator with an adjustable threshold. The output of the comparator fires the reset of the latch 62. The final digital signal has the rising edge encoding the arrival time of the scintillation pulse and the falling edge encoding the width of the pulse.

An example PWM circuit is considered herein to better appreciate its impact on energy resolution for a scintillation detector. Other figures of merit, including spatial resolution, can be easily derived from this framework. First, the variance of the PWM in time is derived:

$$\sigma_{PWM}^2 = \sigma_{CFD}^2 + \sigma_{COMP}^2 + 2\sigma_{TDC}^2 + \frac{\sigma_{V_{CAP}}^2 + \sigma_{V_i}^2 + \sigma_{V_t}^2}{\partial V / \partial t} \quad (1)$$

where $\partial v/\partial t$ is the slope of the discharge, $\sigma_{V_i}^2$ is the variance of the peak input voltage signal, $\sigma_{V_t}^2$ is the variance of the comparator voltage threshold, $\sigma_{V_{CAP}}^2$ is the variance of the voltage on the capacitor, $\sigma_{CFD}^2$ is the variance of the CFD start timing, $\sigma_{COMP}^2$ is the variance of the comparator stop timing, $\sigma_{PWM}^2$ is the variance of the pulse width modulation timing, $\sigma_{TDC}^2$ is the variance of quantization error of the time-to-digital converter, max($V_i$) is the maximum voltage of the input signal, VEE is the negative supply, and RC is the resistor and capacitor used to select slope.

Figure 9:
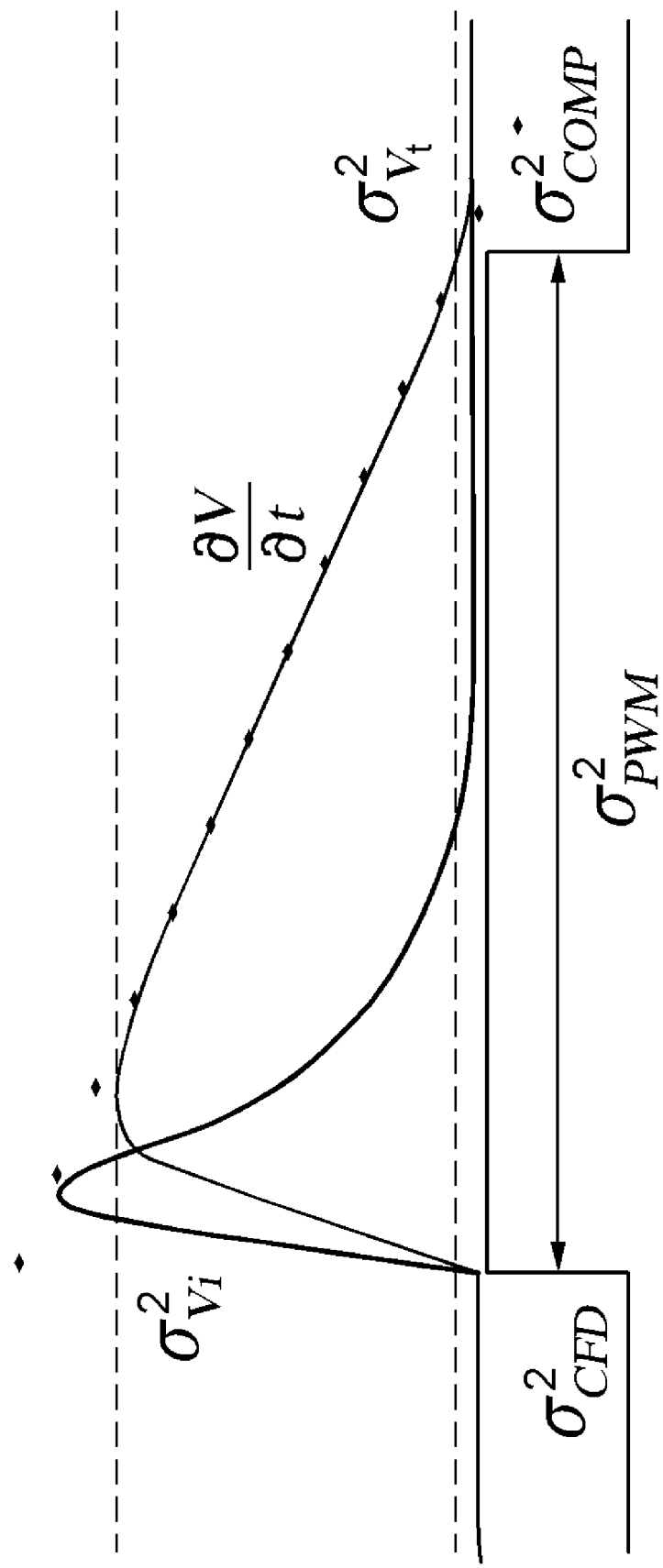
FIG. 9 shows an input scintillation signal entering a peak detector and a linear ramp discharge.

The slope of the discharge is related to the value of the resistor R1 and capacitor C1, as shown in FIG. 9, and the negative supply voltage. In FIG. 9, an input scintillation signal, indicated by a dark solid line, enters a peak detector with a linear ramp discharge, indicated by a light line. The upper dotted line represents the maximum of the signal and is proportional to maximum value of a Gaussian shaped signal. The lower dotted line represents the threshold for firing the trigger.

The discharge is made more linear by connecting the terminal of the resistor to VEE. The slope is $$\partial V / \partial t = \frac{V_i - VEE}{RC} \approx \frac{VEE}{RC} \text{ because } V_i << VEE \quad (2)$$

The variance of the PWM can be converted into energy resolution by optimizing the voltage headroom of the circuits (max($V_i$)≈VEE/2, and max($V_i$)≈scaled so that it accommodates the 511 keV photopeak pulse height).

$$\frac{\sigma_{PWM}}{\max(V_i)/\partial V/\partial t} = 2\sqrt{\frac{\sigma_{CFD}^2 + \sigma_{COMP}^2 + 2\sigma_{TDC}^2}{RC} + \frac{\sigma_{V_{CAP}}^2 + \sigma_{V_i}^2 + \sigma_{V_t}^2}{\max(V_i)}} \quad (3)$$

There is a clear tradeoff in choosing the RC constant. The longer the RC constant, the better the energy resolution (that is, better SNR), but this will come with a penalty in dead-time. The dead-time of this example PWM is different from ADC based converters. However, the dead-time of the example PWM is the same as that for a Wilkinson ADC, because the time to convert the amplitude is linearly related to the amplitude. For Wilkinson ADC or PWM circuits, the non-Poisson nature of the dead-time has been derived. The voltage noise terms of equation (3) should be made small relative to the input amplitude $V_i$. The noise $V_{cap}$ is simply the kT/c noise of the storage capacitor. Usually, the noise of the front end detector is much larger than the noise of these simple elements.

A key performance parameter to be optimized for certain embodiments of the present invention is the dynamic range versus the dead-time of the front-end detector. Thus, an example performance includes an 8-bit dynamic range for a pulse-width modulation (PWM) scheme, which is adequate for high resolution PET systems based on semiconductor detectors such as avalanche photodiodes (APD) or cadmium zinc telluride (CZT).

To test an example embodiment of the present invention, a discrete PWM test board was fabricated and evaluated for energy resolution performance versus a standard peak-sampled ADC. The example PWM circuit includes a peak detector with a linear ramp discharge and a high speed LT1171 comparator. The R was set at 10 k and the C at 100 pF, giving a slope of $$50 \frac{V}{\mu s}.$$

Linearity of the test board was tested by driving a pulser signal into the input preamplifier and measuring the output voltage after a TAC. For these tests, the TAC followed by an ADC mimics a TDC that may be used in an example PWM system.

After pulser linearity tests, a 10 µCi $^{22}$Na source irradiated a 3 mm×3 mm×20 mm LYSO crystal connected to a single 3 mm×3 mm solid state photomultiplier (SSPM) pixel of the SENSL 4×4 SPMArray 3035G16. The example test board contained a fast trans-impedance amplifier (500 Ohms) to amplify and invert the input signal for the input to an Ortec CFD-935. A CFD is very useful for the fast timing for an example PWM scheme. The output of the CFD was the start for the Ortec 567 TAC/SCA. For the energy channel, the signal was shaped by a Cremat-200 100ns Gaussian shaping amplifier. The shaped signal was input to both the discrete PWM circuit and to an Ortec 427A delay amplifier. The latter channel enables comparison to the standard analog modulated processing chain. After level shifting to negative NIM voltage standard, the PWM signal was sent to the stop of the Ortec 567 TAC/SCA. The output of the delay amplifier and the TAC went to an NI-1110 peak-sampling ADC. The Ortec 567 TAC/SCA is used to convert the pulse width back into an amplitude for digitization to mimic the function of the TDC and generate the PWM equivalent of a pulse height spectrum. The $^{22}$Na energy spectrum was acquired fir both the standard analog-modulation, peak-sensing ADC chain and the PWM processing chain.

Figure 10:
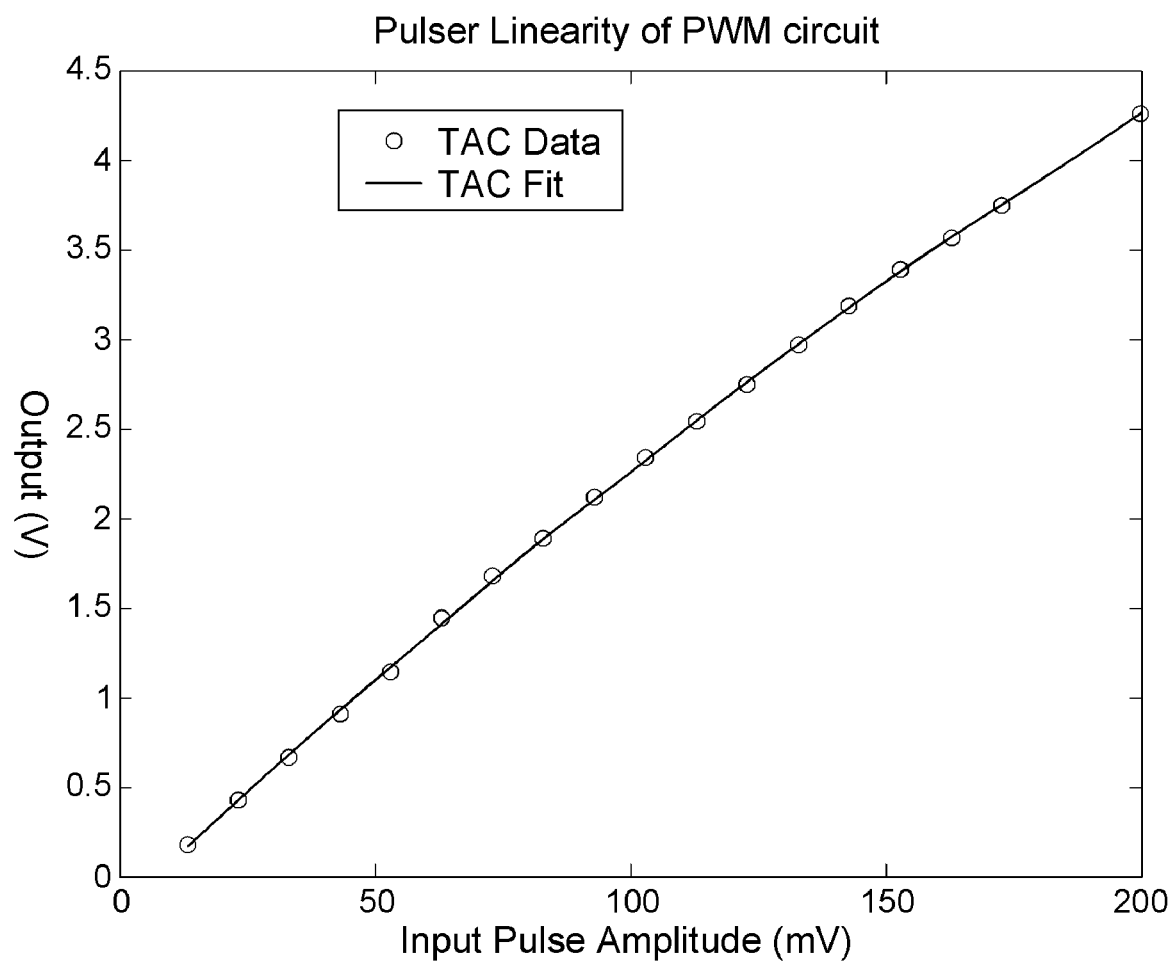
FIG. 10 shows example pulser linearity of a pulse width modulation circuit.

FIG. 10 is a graph showing pulser linearity of the example PWM circuit. As shown in FIG. 10, the linearity of the PWM circuit fits very closely to a second order polynomial over the dynamic range of the PWM. This second order behavior is solely determined by the discharge of the capacitor in the peak detector using a resistor with a large voltage offset. Though the example suffers from some non-linearity because the RC discharge is not a pure current source, this linearity is significantly improved over previous TOT designs and is sufficient for nearly all scintillation applications for PET.

Figure 11:
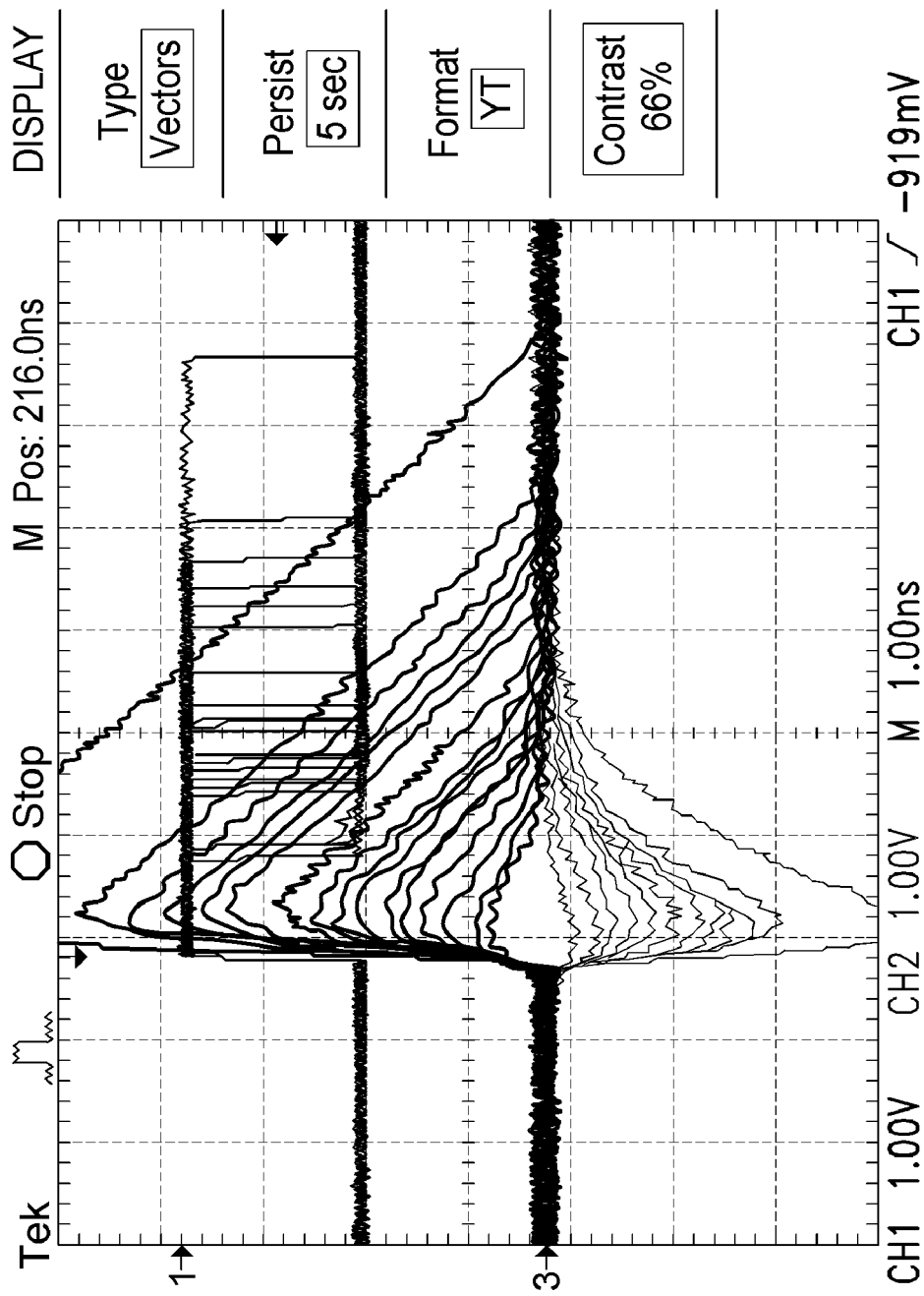
FIG. 11 shows a scope capture of an example pulse width modulation circuit including an input to a constant fraction discriminator, an output of a pulse width modulation (PWM), and a logic output of the PWM.

FIG. 11 shows a scope capture of the example PWM circuit with the input to the CFD (lower, gray), output of the PWM (upper, dark) and the logic output of the PWM that represents the integrated charge for each analog pulse (upper, light gray). The scope capture of the example PWM test board output pulses in FIG. 11 shows the working operation of the circuits for SSPM-based scintillation detection using $^{22}$Na source irradiation. The dead-time for this circuit is approximately 600 ns for a 1.27 MeV photon pulse using a resistor of 10 k and a capacitor of 100 pF. For a 511 keV photon pulse, the dead-time would be approximately 400 ns. The dead-time for just the 100 ns Gaussian shaper is approximately 300 ns, or three times the shaping constant. Therefore, this example discrete PWM circuit implementation does not have a significant dead-time penalty.

Figure 12:
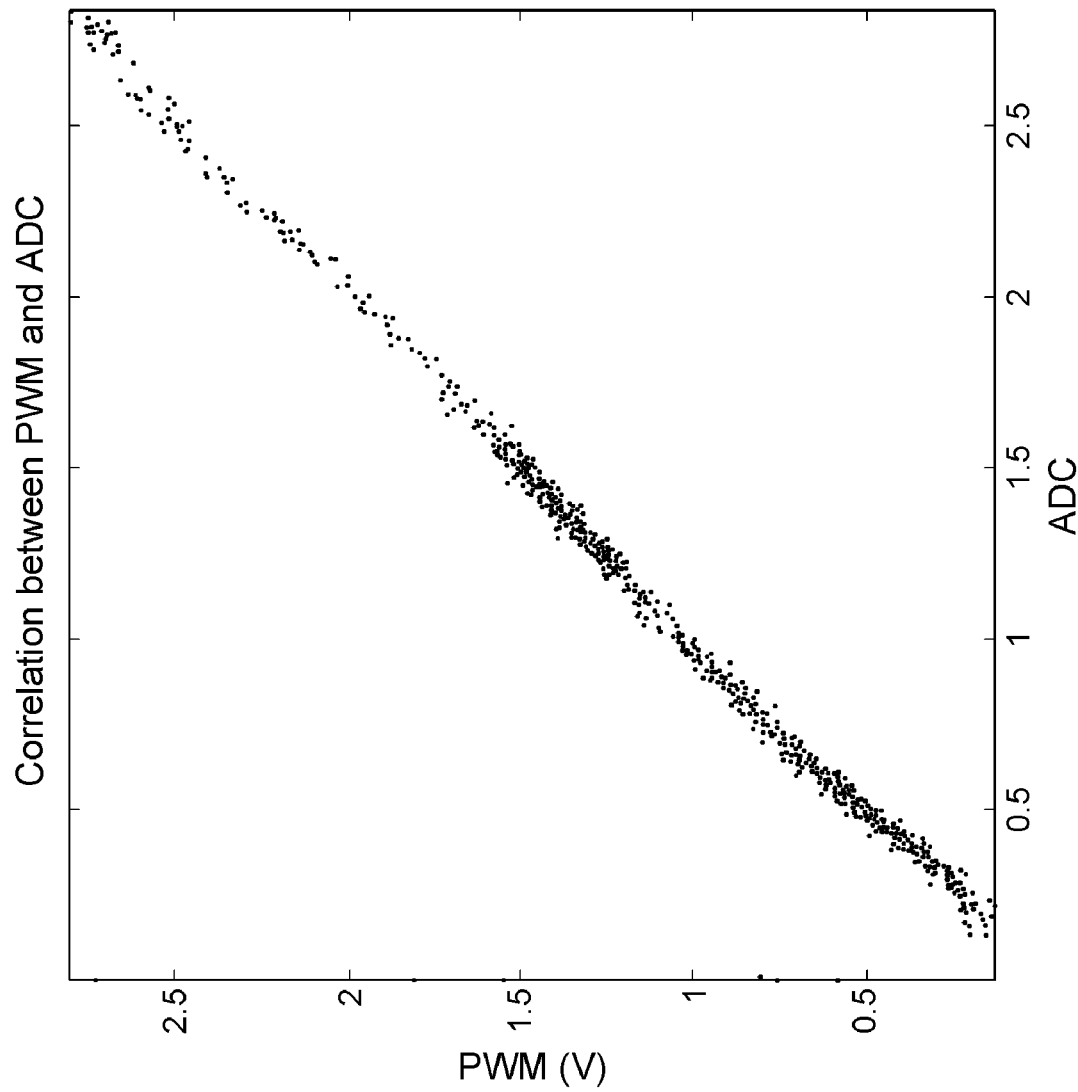
FIG. 12 shows a correlation between example pulse width modulation and a standard analog-modulated processing chain.
Figure 13:
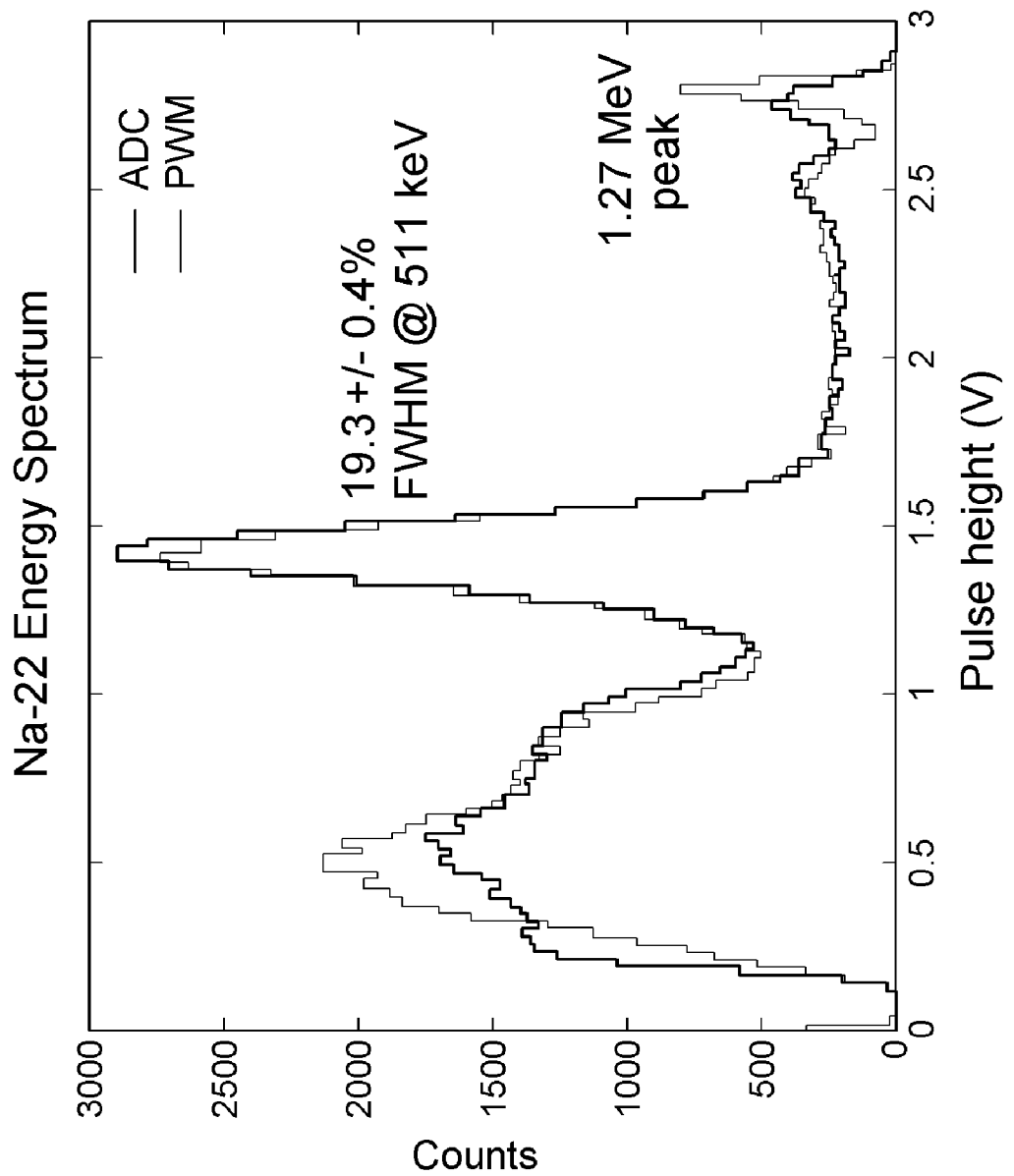
FIG. 13 shows energy spectra of an ADC sampled pulse height of a standard analog-modulated processing chain and example pulse-width modulation for a LYSO-SSPM scintillation detector.

A wide dynamic range (for PET) scintillation signal (0-1.27 MeV) was digitized from the PWM circuit versus the standard analog-modulated digitization. Results are shown in FIGS. 12 and 13. FIG. 12 shows PWM energy $^{22}$Na energy spectra results, which correlate very well with the analog-modulated scheme. FIG. 13 shows the energy resolution of the two conversion schemes, which is identical at 19.4+/0.4% FWHM at 511 keV. The correlation between the ADC and PWM is 1.0 with a 1.2% standard deviation. This example PWM circuit is not fully able to linearize the low amplitude pulses from the 100 ns Gaussian shaper. An RC constant with a larger time constant relative to the shaper constant can be used to remove this small amplitude non-linearity, but this will increase dead-time. This small low-amplitude non-linearity should not be a significant detriment, however.

Example PWM circuits provide a dynamic range, linearity, and SNR with a circuit that can in certain embodiments be relatively simple yet can meet performance parameters needed for high energy imaging, such as but not limited to PET data acquisition designs. Example PWM circuits and methods preserve the low jitter of CFD based triggering while deriving a pulse width from an optimally shaped signal, achieving a high SNR energy signal.

Results suggest that this nonlimiting example test circuit can perform well in high energy photon imaging applications, including but not limited to PET scintillation applications. Example circuits can be used to capture signals from, as nonlimiting examples, a light sharing block detector or a 3-D positioning sensitive detector because of the improved linearity and optimal SNR as compared to conventional, TOT designs for PET.

Figure 14:
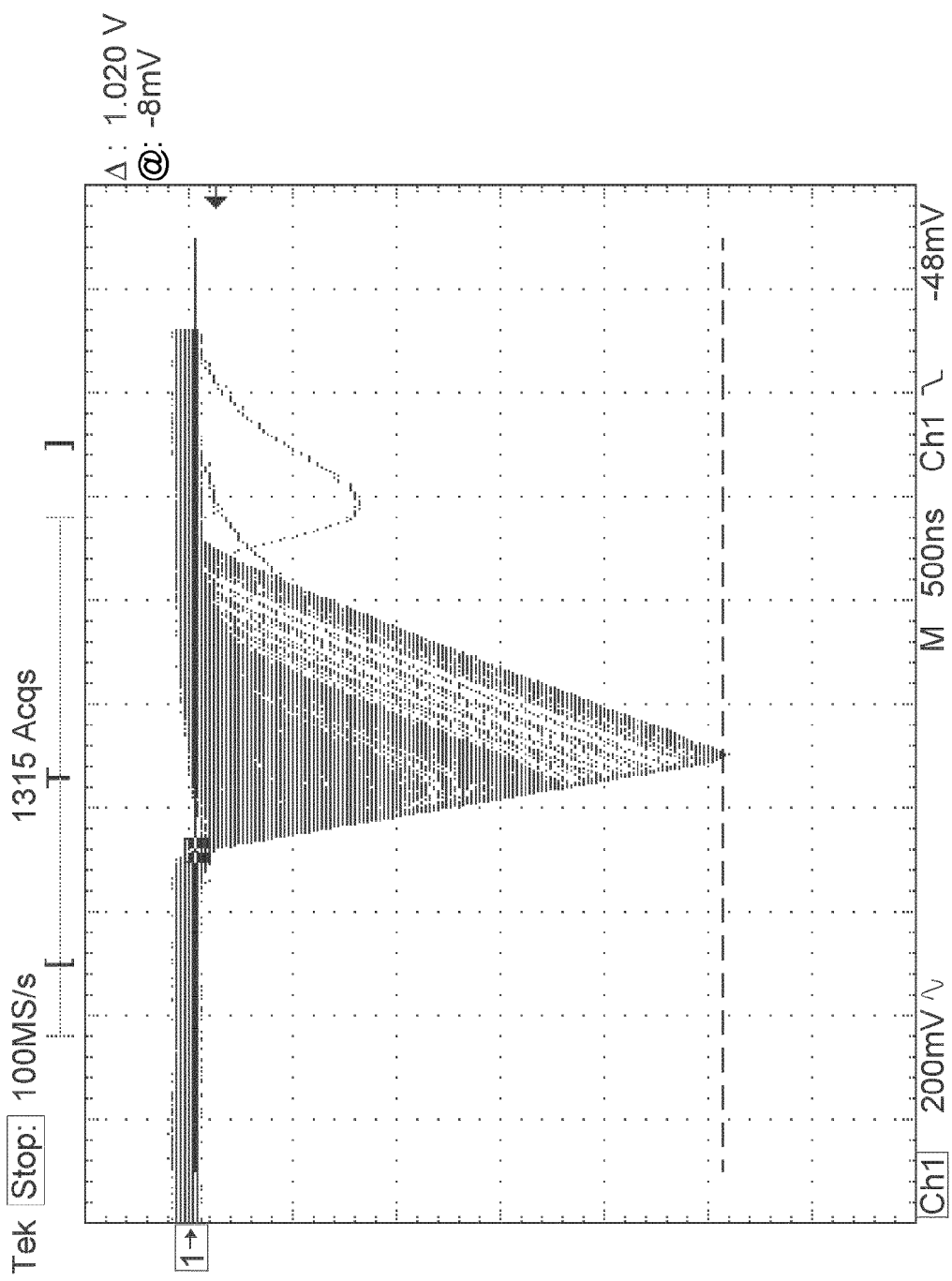
FIG. 14 shows an example pulse having a set rise and fall time.

In another example, both a constant rise time and fall time can be incorporated in the delay circuit to give a larger delay as a function of amplitude. An example of a high energy photon detection by a scintillation detection and analog front-end circuit with a constant rise and fall slope is shown in FIG. 14. In some high energy photon detectors, there may be more than one characteristic time between the start of the signal and the peak of the signal. This happens in a type of phoswich scintillation detector that comprises two or more different scintillators.

Figure 15:
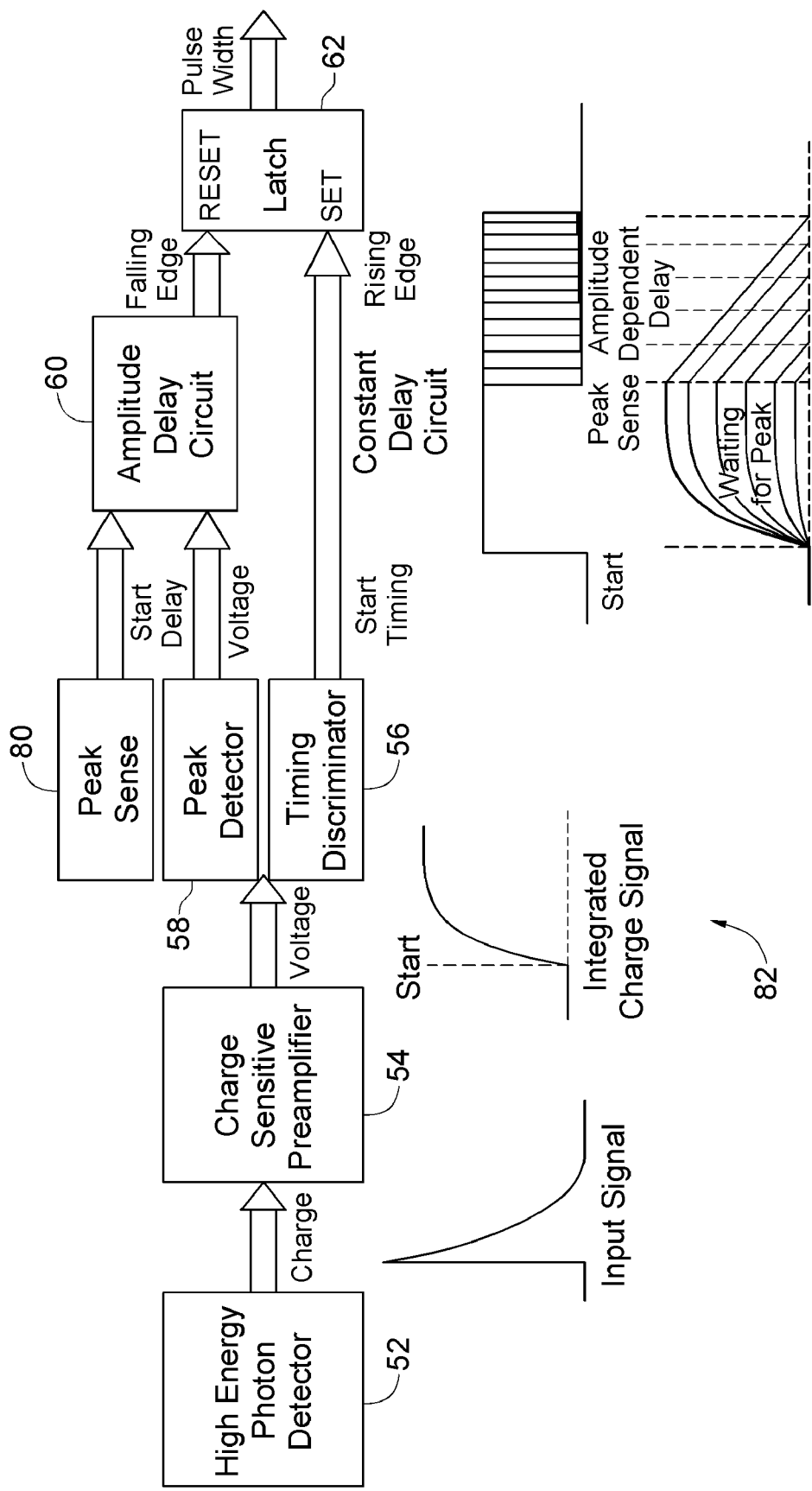
FIG. 15 shows an embodiment of the present invention including a peak sense circuit.

As shown in FIG. 15, a peak sense 80 may be incorporated into a front-end circuit 82 to determine when the peak occurs. The peak sense 80 holds a peak value until being reset, providing a start delay. The signal from the peak sense 80 can also be compared to a constant delay circuit to determine which of the scintillator crystal types were hit, and this can be incorporated into the pulse signal.

Figure 16:
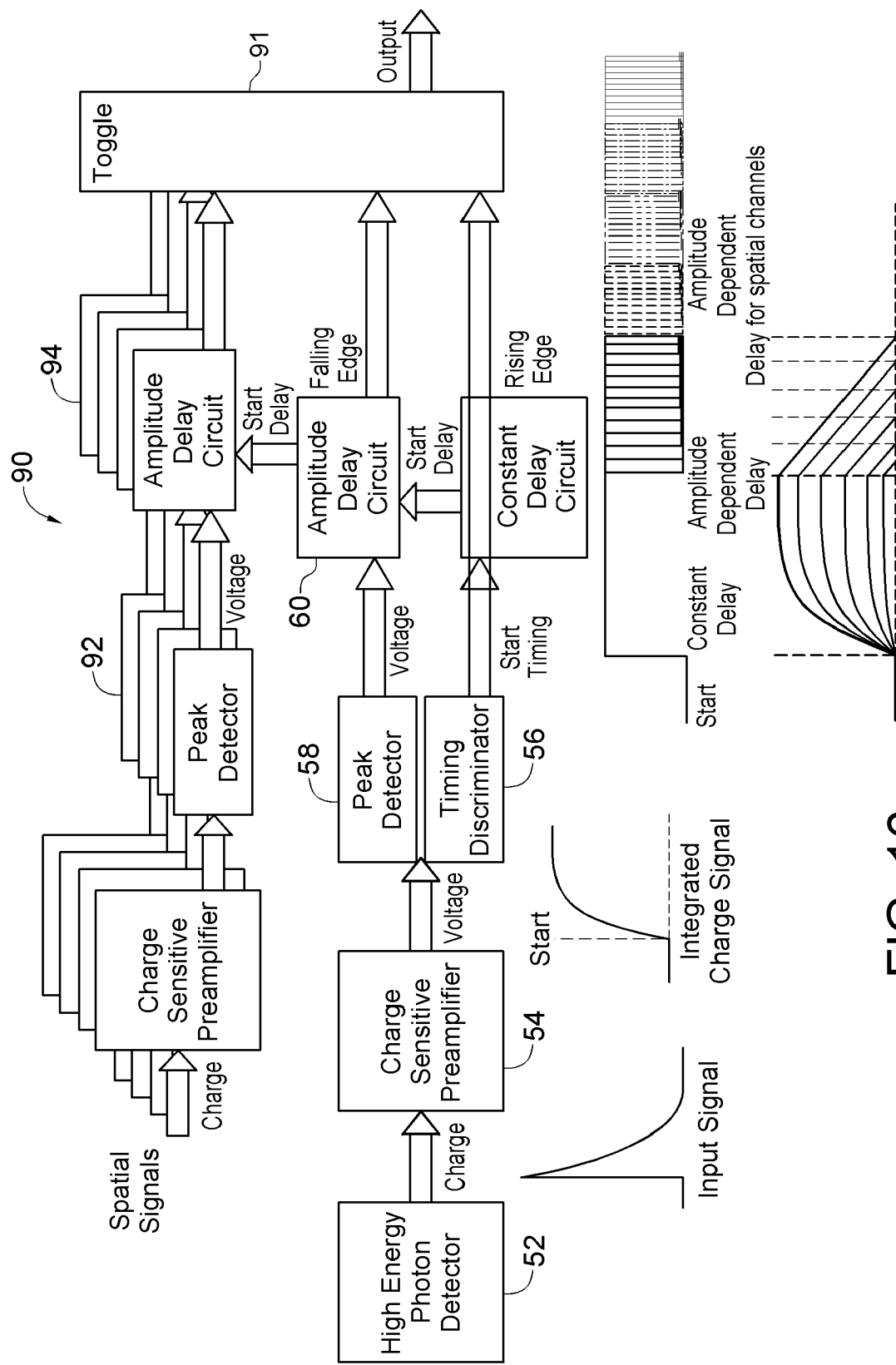
FIG. 16 shows an embodiment of the present invention including a spatial information delay circuit.

A high energy photon detector 52 may also provide spatial signals representing the spatial location of the high energy photon interaction within the detector. For example, as shown in the front end circuit 90 in FIG. 16, the high energy photon detector 52 may output a signal, such as a spatially dependent charge ratio, which records the position (discrete or continuous) of the high energy photon interaction. The resulting output of the front end circuit 90 encodes time, energy, and location of a high energy photon interaction within the detector via a toggle 91. In example embodiments, such spatial signals of the detector can also be encoded using pulse width modulation, and these signals can create edges that are delayed from the edge that encodes the energy of the event. For example, there may be further encoding by using peak detection circuits 92 and constant fall-time generators 94 to digitally encode each of the time of the event, the energy of the event, and spatial signals (minimum of one per dimension encoded). Examples of spatial information for four spatial channels (e.g. channels a, b, c, and d, representing the x and y coordinates), are shown in an example pulse train in FIG. 16. The peak sense 80 detector shown in FIG. 15 can also be useful for assisting processing of the spatial signals.

It is contemplated that other information can be added onto the end of the pulse, but such information can come with a large penalty to the maximum count rate. Additional digital encoding or signaling can occur asynchronously on the same wire to encode detector information or other information. Another example is the decay constant of a scintillator. The latter can allow for phoswich stacked detectors in which interactions occurring in the different scintillation crystals can be identified based on different light decay constants intrinsic to each scintillator. The peak sense circuit 80 shown in FIG. 15 may be useful for this feature as well. The output from a peak sense circuit 80 can be compared to that from a constant delay circuit and, depending on whether it is before or after the constant delay, can determine which layer of the phoswich scintillator was hit.

Figure 17:
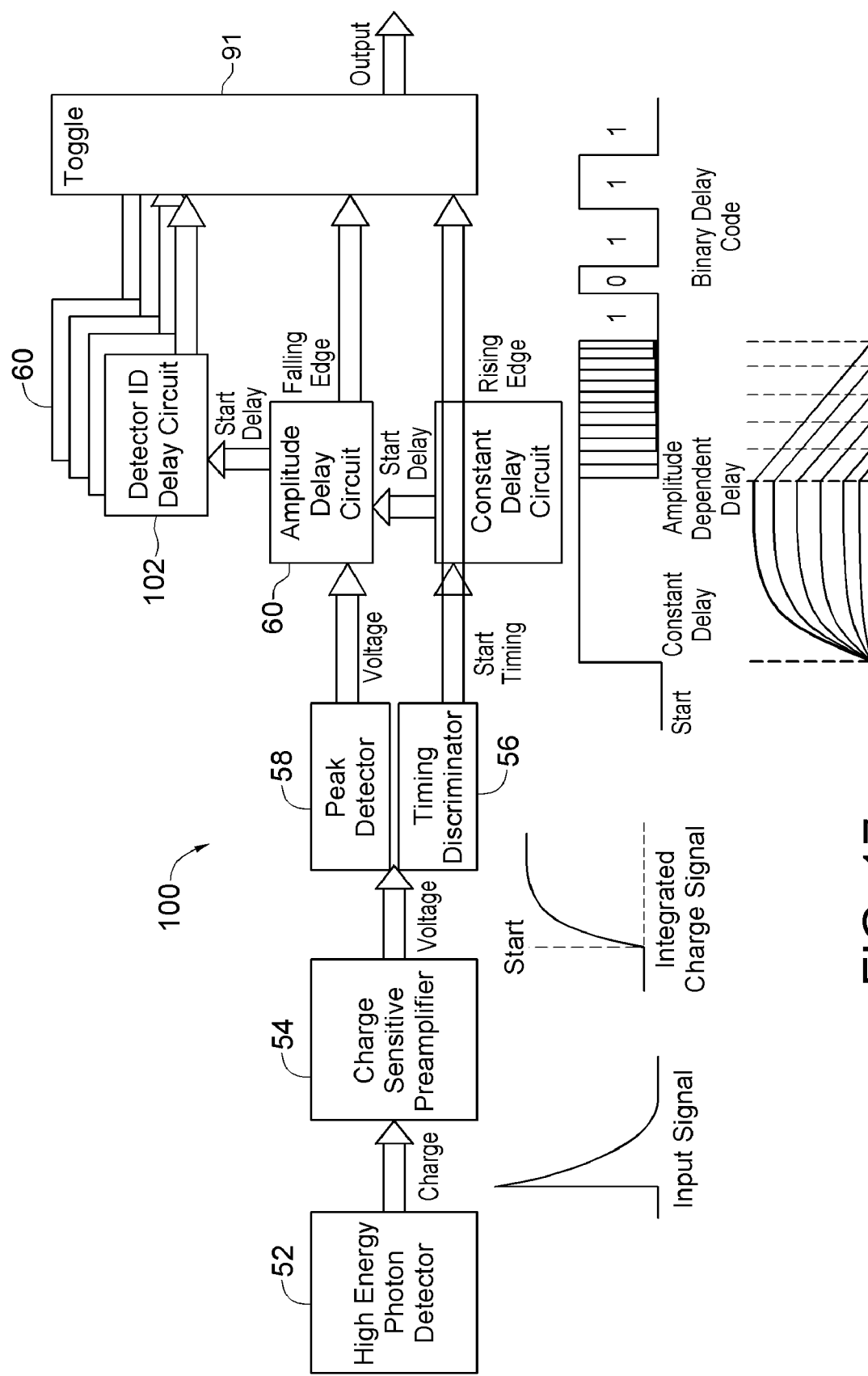
FIG. 17 shows an embodiment of the present invention including a detector ID circuit.

As a nonlimiting example, in a front end circuit 100 shown in FIG. 17, a detector ID delay circuit 102 may output a detector ID in the form of binary code that uniquely identifies a detector. This detector ID may be encoded, for example, by binary encoding, or run-length encoding.

The front-end circuit may include, for example, a circuit that combines the time, energy, spatial information, and one or more other signals (such as, but not limited to, a detector ID) into an output signal such as a pulse train. One or more output lines, but preferably one output line, from the front-end circuit may be a suitable output line for carrying the output signal. This output line may carry, for example electrical and/or optical signals, and thus may be an electrical and/or optical wire or wires.

Optical coupling may be performed by a circuit that modulates the intensity of light in a laser diode. The light of the laser diode can be coupled into an optical fiber. The light of the laser can be detected using a photodetector. The light intensity can be converted into an electrical signal. The electrical signal can then be converted into a digital signal. In this way, optical transmission is equivalent to electrical transmission. Nonlimiting example embodiments for optical coupling are provided in U.S. patent application Ser. No. 12/246,326, filed Oct. 6, 2008, to the present inventors.

It is preferred that the output signals for multiple detectors be multiplexed into as few output lines as possible. This is especially preferred if a signal detector has multiple signals. For example, a position sensitive avalanche photodiode (PSAPD) may have 5 signals, requiring 5 shaping amplifiers and 5 peak detectors. Because all 5 events happen at the same time, it is desirable to read out all 5 events using the same output line. In a preferred embodiment, a timing accurate comparator determines an arrival time of a first event. The 5 signals can be encoded (e.g., by a suitable logic circuit) such that the high-to-low transition of the first event leads to the second one, and onto the third, fourth, and fifth event. This cascaded modulation is especially useful for reducing the number of output lines needed (in this case, one wire transmits 5 encoded signals).

Referring again to FIG. 6, the output line or lines are suitably connected to a readout system 48 for receiving the output signal from the front end system and decoding the signal for further processing. Example readout systems include, but are not limited to, a time-to-digital converter, which converts the pulse width to an amplitude. Other suitable systems include a time-to-digital converter based on high speed counters. As a nonlimiting example, time-to-digital converters are already included in some known imaging devices, such as some known PET systems (for recording time information of a pulse). These may be used as a readout system, as would be appreciated by those of ordinary skill in the art. The decoded signal can then be processed according to methods known to those of ordinary skill in the art. Accordingly, example methods and systems of the present invention preferably are suitable for use with existing systems, such as imaging systems, as a front-end.

A significant advantage of example embodiments of the present invention is a reduction in the number of electronic connections needed between the detector and the readout system. This advantage is provided because multi-parameter signals can be encoded into fewer wires or a single wire, rather than having several wires encoding the signal. High energy photon detection systems, including but not limited to advanced positron emission tomography (PET) systems or other high energy photon/radionuclide detection systems, can have hundreds to many thousands of detectors. Each of these detectors must resolve the time, energy, and spatial information of a high energy photon interaction. In many imaging detectors, one signal encodes the digital trigger, which is used for timing information. Four signals encode the spatial and energy signals, and each of these four signals needs to be digitized by an analog-to-digital converter. Therefore, five signals must be connected from the detector to the analog readout in the conventional system for a particular detector, rather than only one signal in the example pulse-width modulated design. Digitally encoding the signal onto a single wire allows more flexibility and drastically simpler data acquisition electronics versus analog encoding of the signal. However, it will be appreciated that more than one signal wire may be used if desired.

The entire pulse duration should be minimized to allow for the highest number of detected pulses per unit time per signal wire. There are tradeoffs in the amount of time it takes to integrate the charge and filter the incoming signal before detecting the peak of the signal. Filtering, such as Gaussian shaping, can provide the largest signal-to-noise ratio for a given decay time constant for a scintillator while minimizing broadband noise. If an inadequate filtering time constant is chosen to minimize the pulse width, then a non-optimal signal-to-noise ratio will be achieved. A fixed, detector dependent, constant delay from the start of the signal to the peak of filtering circuit signal using the optimal time constant can be sampled in the peak detector. Further, embodiments of the present invention provide the minimum pulse width for linear encoding of the output of a high energy photon detector. Thus, for a particular desired signal-to-noise ratio (SNR), which is a function of the pulse width, embodiments of the present invention allow the signal to be encoded in the most efficient manner possible.

Yet another advantage is that digital multiplexing has no degradation in performance, whereas analog multiplexing reduces performance for each detector added into a multiplexing circuit. As shown in FIGS. 4-5, analog electronic multiplexing is a current method to attempt to reduce the number of readout channels. Detectors can be connected using spatial encoding so that many detectors can be read out using a common readout path. Analog electronic multiplexing, however, degrades the amplitude and timing information of the signal. Therefore, there is a limit to how many channels can be multiplexed together. As shown in FIG. 6, digital signals, by contrast, can be almost infinitely multiplexed with very little degradation in performance. This allows for far fewer channels that digitize the signals without performance degradation.

Additionally, digital signals in example embodiments of the present invention can be transmitted by methods other than analog transmission. Examples of digital transmission include electronic transmission over a multiplex channel, or over an optical fiber. A digital output, for example, may be coupled to a laser driver for generation of optical signals. The digital signal is much more robust in the present of noise, attenuation, and interference. As a nonlimiting example, it is easier to transmit digital signals using optical encoding over fiber using the same high performance telecommunications technology that is used to route digital packets. Analog signal transmission over wires is greatly constrained by noise and power requirements, whereas digital signal transmission over optical fibers has many advantages in applications that require relaying signals over great distance, in highly electromagnetically interfering environments, or both.

According to example embodiments of the present invention, by integrating a simple portion of electronics adjacent to a PET detector, the signals can be relayed over digital communication channels. This allows for a large reduction in the number of readout channels, and for robust delivery of the information signals to back end data processing electronics. PET detectors as part of a system according to embodiments of the present invention can be placed in environments where it has been difficult to operate, such as in an MR system.

As another advantage, time-to-digital converters can be used to replace the analog-to-digital converters in embodiments of the present invention. Particularly, by encoding the signal by pulse width, the amplitude can be recovered using time-to-digital converters rather than analog to digital converters. Time-to-digital converters are already used in some conventional systems to recover the timing information of the pulse, and according to embodiments of the present invention they can be reused to give the amplitude and spatial information. This allows the elimination of analog-to-digital converters in a system if desired.

Each of the hundreds to thousands of detectors in a conventional high energy photon/radionuclide detection system has sensitive analog circuits that must be connected over cables from the detector to devices or systems for data acquisition. Integrated circuits implementing pulse width modulation can be created directly in a detector simply and easily. By integrating a simple portion of electronics adjacent to the detectors, the signals can be relayed over digital communication channels. This allows for a large reduction in the number of readout channels, and for robust delivery of the information signals to the back end data processing electronics. Example embodiments of the present invention can greatly reduce the cost of the data electronics, while at the same time allowing the placement of these detectors in harsh environments that hinder effective operation, such as but not limited to a magnetic resonance imaging (MRI) system. However, it is to be understood that high energy photon detection systems alone may be provided and used according to embodiments of the invention without an MR system or other system.

Nonlimiting example applications for the present invention include high energy physics, such as scintillation or solid-state detectors, nuclear medicine applications, such as positron emission tomography (PET), gamma ray imaging, or single photon computed tomography (SPECT), defense applications for nuclear weapons proliferation or homeland defense, including gamma ray spectroscopy and imaging detection, and oil well drilling, such as by using scintillation detectors in harsh drilling environments.

Though particular nonlimiting example PWM circuits are described, it will be appreciated by those of ordinary skill in the art that several modifications are possible. For example, alternative linear ramp circuits could easily be implemented in ASICs or more discrete components to achieve much better linearity (though such circuits may increase complexity). Also, the peak detector with resistive discharge can easily replaced by, for example, a sample-and-hold with current source discharge architecture in an ASIC design. This would remove the non-linearity for small signals that the peak-detection method may suffer from with small RC constants used to improve dead-time performance. Further, the timing CFD of the front end may be replaced with a fast leading edge discriminator. The amplitude information may be used to remove the time walk. However, it is preferred that the same comparator that is used for timing not be used for the energy signal, otherwise a poor tradeoff between timing and energy SNR may result.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method of processing an analog signal that is generated by a high energy photon detector in response to a high energy photon interaction, the method comprising:
   receiving the analog signal;
   generating a digital edge representing the time of the interaction from the analog signal along a first path;
   encoding the energy of the interaction as a delay from the digital edge from the analog signal along a second path;
   wherein said generated digital edge and said delay encode the time and energy of the analog signal using pulse width modulation;
   wherein said encoding the energy comprises:
   converting the analog signal to a converted signal having a first edge and a falling signal edge with constant slope decay from a peak, wherein the peak is proportional to an integral of a charge of the analog signal:
   determining a length of time for the converted signal to decay to zero from the peak; and
   encoding said determined length of time as the delay from the digital edge.

2. The method of claim 1, wherein said generating a digital edge comprises:
   employing an amplitude-independent timing circuit to encode a time of the interaction as the digital edge.

3. The method of claim 1, wherein the high energy photon interaction is one of a pair of coincident interactions of high energy photons with a high energy photon detector generated from a positron-electron annihilation event.

4. The method of claim 1, further comprising:
   digitally encoding at least one of the spatial location of the high energy photon interaction and an identification of the detector using pulse width modulation.

5. The method of claim 4, further comprising:
   providing a combined signal comprising said digital edge, said encoded energy, and said digitally encoded at least one of spatial location and said digitally encoded identification;

transmitting said provided digital signal on a multiplexed output line.

6. The method of claim 5, wherein said output line is at least one of electrical and optical in nature.

7. The method of claim 1,
wherein said determining a length of time is conducted on a first channel having the converted signal as an input.

8. The method of claim 7, wherein said determining a length of time comprises:
detecting the peak of the converted signal;
providing a delay for the converted signal that is dependent on an amplitude of the detected peak;
determining the length of time based on said provided delay.

9. The method of claim 1, further comprising:
providing a multi-detector combined signal for a detection system comprising a plurality of high energy photon detectors;
wherein said providing comprises, for each of the high energy photon detectors, providing a generated digital edge representing the time of a high energy photon interaction and an encoded energy of the interaction as a delay from the digital edge;
wherein the generated digital edge and the delay encode the time and energy of the analog signal using pulse width modulation.

10. The method of any of claim 1, further comprising:
decoding said generated digital edge and delay using a time-to-digital converter.

11. A front-end device for processing an analog signal that is generated by a high energy photon detector in response to a high energy photon interaction, the front-end device comprising:
a time encoding circuit along a first path that generates a digital edge representing the time of the interaction;
an energy encoding circuit along a second path that encodes the energy of the interaction as a delay from the digital edge;
wherein said time encoding circuit and said energy encoding circuit encode the time and energy of the analog signal using pulse width modulation;
wherein said encoding the energy comprises:
converting the analog signal to a converted signal having a first edge and a falling signal edge with constant slope decay from a peak, wherein the peak is proportional to an integral of a charge of the analog signal;
determining a length of time for the converted signal to decay to zero from the peak;
encoding said determined length of time as the delay from the digital edge.

12. The front-end device of claim 11, further comprising:
a preamplifier for receiving the analog signal and integrating the analog signal.

13. The front-end device of claim 12, wherein said energy encoding circuit is coupled to said preamplifier to receive said integrated signal along the first path.

14. The front-end device of claim 13, wherein said time encoding circuit is coupled to said preamplifier to receive said integrated signal along the second path.

15. The front-end device of claim 14, wherein said preamplifier comprises a charge sensitive preamplifier.

16. The front-end device of claim 14, wherein said time encoding circuit comprises a timing discriminator.

17. The front-end device of claim 14, wherein said energy encoding circuit comprises:
a peak detector for converting the integrated signal and detecting the peak of the converted signal;
a delay circuit for providing a delay dependent on an amplitude of the converted signal.

18. The front-end device of claim 17, wherein said peak detector further comprises:
a comparator for determining when the falling signal edge of the converted signal reaches a threshold.

19. The front-end device of claim 17, wherein said peak detector further comprises:
a shaper for shaping the integrated signal and providing the converted signal, the converted signal having a falling signal edge with a constant slope.

20. A front end for an imaging system, comprising:
at least one high-energy photon detector comprising at least one detector channel; and
the front-end device of claim 11.

21. An imaging system comprising:
the front end of claim 20; and
a readout system coupled to said front end.

22. The imaging system of claim 21, wherein said readout system comprises a time-to-digital converter.

23. The imaging system of claim 21, wherein said front end comprises a digital bus.

24. An imaging system comprising:
a front-end device for processing an analog signal that is generated by a high energy photon detector in response to a high energy photon interaction; and a readout system coupled to said front-end device; wherein the front-end device comprises:
a time encoding circuit along a first path that generates a digital edge representing the time of the interaction; and
an energy encoding circuit along a second path that encodes the energy of the interaction as a delay from the digital edge;
wherein said time encoding circuit and said energy encoding circuit encode the time and energy of the analog signal using pulse width modulation;
wherein said front-end device is disposed within a magnetic resonance imaging (MRI) system;
wherein said front-end device is coupled to said readout system via an optical coupling to reduce interference between said front-end device and said MRI system.

* * * * *

UNITED STATES PATENT AND TRADEMARK OFFICE
CERTIFICATE OF CORRECTION

PATENT NO. : 8,258,480 B2
APPLICATION NO. : 12/397195
DATED : September 4, 2012
INVENTOR(S) : Olcott et al.

It is certified that error appears in the above-identified patent and that said Letters Patent is hereby corrected as shown below:

In the Specification:

Col. 8, line 16      Please delete "∂v" and insert --∂V-- therefor.

Col. 8, line 18      Before "is the variance", please delete "CAP".

Col. 8, line 50      In equation (3) please delete

"$\frac{\sigma_{PWM}}{max(V_i)/\partial V/\partial t} = \sqrt[2]{\frac{\sigma^2_{CFD} + \sigma^2_{COMP} + 2\sigma^2_{TDC}}{RC} + \frac{\sigma^2_{V_{CAP}} + \sigma^2_{V_l} + \sigma^2_{V_t}}{max(V_i)}}$" and insert $\frac{\sigma_{PWM}}{max(V_i)/\partial V/\partial t} = \sqrt[2]{\frac{\sigma^2_{CFD}+\sigma^2_{COMP}+2\sigma^2_{TDC}}{RC} + \frac{\sigma^2_{V_{CAP}}+\sigma^2_{V_l}+\sigma^2_{V_t}}{max(V_i)}}$ -- therefor.

Col. 9, line 47      Please delete "fir" and insert --for-- between "acquired" and "both".

Signed and Sealed this
Fifth Day of February, 2013

Teresa Stanek Rea
*Acting Director of the United States Patent and Trademark Office*